US006943776B2

(12) United States Patent
Ehrenburg

(10) Patent No.: US 6,943,776 B2
(45) Date of Patent: Sep. 13, 2005

(54) COMPUTER-COMPATIBLE, VISUALIZABLY PRESENTED, INTUITIVE AND SELF-EXPLANATORY MANUAL INPUT SYSTEM

(76) Inventor: Herman Ehrenburg, Parallelweg 90, 1541 BC Koog aan de Zaan (NL)

(*) Notice: Subject to any disclaimer, the term of this patent is extended or adjusted under 35 U.S.C. 154(b) by 296 days.

(21) Appl. No.: 10/083,746

(22) Filed: Feb. 25, 2002

(65) Prior Publication Data

US 2003/0067444 A1 Apr. 10, 2003

Related U.S. Application Data

(63) Continuation-in-part of application No. 09/621,751, filed on Jul. 24, 2000, now abandoned.

(51) Int. Cl.[7] .................................................. G09G 5/00

(52) U.S. Cl. ......................... 345/168; 345/156; 341/21; 341/22

(58) Field of Search ................................ 345/168, 156, 345/161; 341/20–23, 26, 28

(56) References Cited

U.S. PATENT DOCUMENTS 3,507,376 A 4/1970 Kafafian
4,458,238 A * 7/1984 Learn .......................... 341/20
4,484,305 A * 11/1984 Ho ............................. 715/535
4,555,193 A 11/1985 Stone
4,655,621 A 4/1987 Holden
4,680,572 A 7/1987 Meguire et al. ........ 340/365 R
4,775,255 A 10/1988 Langley ...................... 400/485
4,833,446 A 5/1989 Eilam et al. .................. 341/22
5,017,030 A 5/1991 Crews ........................ 400/485
5,189,416 A 2/1993 Estes .......................... 341/26
5,535,421 A 7/1996 Weinreich ................... 395/887
5,642,108 A 6/1997 Gopher et al. ................ 341/22
5,790,103 A 8/1998 Wilner
5,900,864 A 5/1999 MacDonald ................ 345/172
5,905,493 A 5/1999 Belzer
6,232,956 B1 * 5/2001 Mailman .................... 345/156

FOREIGN PATENT DOCUMENTS

WO WO-89/19227 * 5/1998

* cited by examiner

*Primary Examiner*—Alexander Eisen
*Assistant Examiner*—Kimnhung Nguyen
(74) *Attorney, Agent, or Firm*—David Pressman

(57) ABSTRACT

A manual input system for efficient generation of inputs by entering chords comprises a keyboard (66) with ten colored keys (74, 76, 78, 80, 82, 84, 86, 88, 90, and 92) and a legend (94) The keys of the keyboard (66) each are operated by a different digit of a human operator and each have a different color. The legend (94) presents the assignment of chords to the symbols found on the standard computer keyboard. Character chords involve only fingers, while modifier chords involve only thumbs, so that each character can be combined with each modifier. Command chords also involve a thumb, so that accidental input of modified characters and commands during character input is prevented. The legend (94) shows determination of chords by visualizing the position of symbols relative to the rows. Chords are represented by combinations of digit-representing colored area. Each colored area resembling a digit or colored keys.

73 Claims, 4 Drawing Sheets

94
74
76
78
80
82
84
86
88
90
92
66

COMPUTER-COMPATIBLE, VISUALIZABLY PRESENTED, INTUITIVE AND SELF-EXPLANATORY MANUAL INPUT SYSTEM

CROSS-REFERENCE TO RELATED APPLICATION

This application is a continuation-in-part of my application Ser. No. 09/621,751, filed Jul. 24, 2000 now abandoned.

FEDERALLY SPONSORED RESEARCH

None

Sequence Listing or Program

This application contains an Appendix listing a data table and a computer program used in the implementation of the invention.

BACKGROUND OF THE INVENTION—FIELD OF INVENTION

This invention relates to desktop and laptop computers, PDAs (Personal Desktop or Digital Assistance), calculators, etc., and their successors, specifically to a manual input system for such devices.

BACKGROUND OF THE INVENTION—PRIOR ART

The desktop and laptop computer, the PDA, and the calculator have different systems for alphanumeric input. Examples are the desktop keyboard, the laptop keyboard, PDA keyboards, calculator keyboards, speech recognition systems, and handwriting recognition systems. Each of these input systems has serious shortcomings. Furthermore, users of more than one of these devices usually have to learn more than one system for alphanumeric input. Existing systems usually suffer from one or more of the following drawbacks: large size, difficult to learn to use, difficulty of use, awkward operation, lack of accuracy in input operation, and inability to handle character input, command input, and modified character input.

Specifically, the desktop keyboard is not compact and is difficult to learn to use efficiently. The laptop keyboard, in addition, has keys that are too small. PDAs have keyboards that are too small or input systems that are inefficient. Calculator keyboards have an inefficient layout. Computer pointing devices, such as the mouse, are inefficient. Speech recognition systems are difficult to use, inaccurate, and impractical. Handwriting recognition systems are inefficient. And other input systems are not powerful enough.

For over a century the so-called qwerty keyboard (named for the first six letters on its top row) has been the standard input device for text. A version, termed "Multi-Functional Keyboard, Version 2" was developed and defined by IBM for use with Intel-compatible personal computers ("PCs"). It has become the standard computer keyboard. Today, it is use as the keyboard for nearly all computers. In some cases it has minor modifications, such as a more compact layout for laptops or a few extra keys. The qwerty keyboard is widely regarded as inferior to alternative input systems, such as the Dvorak keyboard (U.S. Pat. No. 2,040,248 to A. Dvorak and W. L. Dealey, 1936). Nevertheless none have been able to replace the qwerty keyboard as a standard due to its strongly entrenched position.

The standard computer keyboard has significant disadvantages. To operate almost all keys, a finger has to move to the position of the key. This requires error-prone finger movement, leading to typing errors. Users unfamiliar with the letter layout, which was purposely designed to slow typing to prevent jamming, have to search (inefficiently) for letters. Consequently, the keyboard is difficult to use for first-time users. To type text somewhat efficiently, a user has to memorize the positions of the chaotically arranged letters. Learning such positions is difficult and requires considerable training.

To avoid confusion, a distinction is made between a "digit" and a "finger". A "digit" refers to one of the five digits of the human hand. A "finger" refers to one of four digits of the human hand, excluding the thumb.

To learn to operate the keyboard efficiently (using all ten digits (fingers and thumbs)) is very difficult. The user has to invest a lot in training. The user has to acquire difficult motor skills to operate the irregularly placed letter keys.

For this reason, the large majority of users use less than ten digits to type, which is inefficient. Most people use two fingers. They search for a letter on the keyboard before pressing its key (so-called "hunt-and-peck" operation), which is very inefficient. Typing with ten digits requires different skills than typing with two fingers. So the skills acquired while using the keyboard with two fingers are not useful when learning to type with ten digits. On the contrary, these skills are an obstacle. The user is tempted to stick to familiar (but inefficient) keyboard habits.

Ten-digit operation of the keyboard has the following additional disadvantages. The most frequently used letters (E, T, A, O, I, and N) are not input by the easiest keys to operate.

The inventors of the typewriter who designed the qwerty keyboard did not make an effort to arrange the letters ergonomically (the top row was selected merely to contain the word "typewriter"). The hardest key operations, occur frequently and require simultaneous pressing of two keys, one of which is always operated by a little finger having to reach for a key.

Many keys, including frequently used keys (such as the arrow keys), are so distantly located from other keys that they require a whole hand to be moved, which is very inefficient. The weakest digits (the little fingers) operate most keys, including some important and frequently used keys, such as the Backspace key. The modifier keys (Shift, Ctrl, and Alt) are close together and difficult to operate, which often leads to errors. The modifier keys and the command keys on the main keypad are insufficiently separated from character keys. Consequently, it is easy to press command keys or modifier keys accidentally on the main pad during character input. This results in problematic and potentially confusing input of commands and modified characters.

The strongest digits (the thumbs) are used for pressing only one key, the space bar. Accidentally (re)placing the fingers incorrectly on the keyboard, that is not on their home keys, often leads to a subsequent sequence of unintended inputs. While learning to type with ten digits, many letters on the keyboard are obscured by the fingers. Finger movement between keys fundamentally limits the speed of operation. For example, to type the frequently occurring letter sequence "ed" the user has to move a single finger from the E key to the D key.

Also it is common to accidentally press the Caps Lock key, which often leads to a subsequent sequence of unintended inputs.

Relatively recently a graphical user interface with pull-down menus has become standard on computers. Around the time these graphical user interfaces were introduced, the mouse was also introduced. The mouse (or an alternative pointing device) is standard on computers today. The mouse, the touch pad, the track ball, and the joystick are examples of pointing devices. A pointing device is efficient at positioning a cursor at a position on a display because both move in two dimensions, enabling an operator to instantly map an intended movement of the cursor to a corresponding swift movement operation of the pointing device. Pointing devices are inefficient for menu and menu item selection, for which they are mainly used with graphical user interfaces. Using a mouse in combination with the standard computer keyboard requires the operator to switch between the two. This is inefficient, slow, and awkward.

The need to use a pointing device for selection purposes with graphical user interfaces is due to shortcomings of the standard computer keyboard. For selection of symbols not present on the standard computer keyboard, a pointing device in combination with a graphical user interface is easier to operate than the standard computer keyboard. Menus and menu items displayed by a graphical user interface can in many cases also be selected by pressing key combinations of keys on the standard computer keyboard. But the key combinations are difficult to press.

Recently, additional keys have been introduced on keyboards to overcome the inefficiency of the mouse at symbol selection. For example, the Microsoft Windows operating system has a flag-symbol key. The shortcomings with respect to symbol selection, however, are inherent in the design of the standard computer keyboard. Adding a key for every new symbol is not a viable solution, because in time the keyboard would become unwieldy in size.

The persistence of a standard, or qwerty, keyboard is due to what economists call "lock-in" and "network externalities". "Lock-in arises whenever users invest in multiple complementary and durable assets specific to a particular information technology system" ("Information Rules" by C. Shapiro and H. R. Varian (Harvard Business School Press, 1999) p. 12). "When the value of a product to one user depends on how many other users there are . . . this product exhibits network externalities, or network effects" (Ibid, p. 13). Individual users of the qwerty keyboard have invested in training specifically for the difficult-to-learn qwerty keyboard, giving rise to lock-in. The qwerty keyboard also exhibits network externalities. It is easy to switch between keyboards, since almost all users use the qwerty keyboard. Also the standard computer keyboard is complementary to most existing hardware and software, which again gives rise to lock-in. The keyboard furthermore has an advantage over most alternative input systems because it is mass produced and sold in a very competitive market. This makes standard computer keyboards very cheap ($5–10 for OEMs).

So the standard computer keyboard potentially has at least the following important advantages over an alternative input system: training lock-in, network externalities, hardware and software lock-in, and a very low price.

The standard computer keyboard also has other advantages. The keyboard is intuitive and mostly self-explanatory. It is easy to understand how to use it and to start using it, because keys are labeled with the symbol they input. Consequently, the keyboard can immediately be used by first-time users. Learning the positions of the chaotically arranged letters is difficult, but relatively easy for hunt-and-peck typists, since they can gradually learn the position of letters while inputting text. Also, people are relatively good at remembering the positions of stationary objects they see repeatedly, such as the letters on a keyboard. Consequently, the letters on the keyboard are relatively easy to remember, which makes it easier to use for hunt-and-peck typists and also helps users somewhat who are learning to type with ten digits.

To be successful in replacing the standard computer keyboard, an alternative input system has to counter its advantages. An alternative input system should improve on, match, or compensate for the advantages of the standard computer keyboard. And an alternative input system should significantly improve on the standard computer keyboard as a whole, to make potential users switch to it.

A "chord" is defined as a subset of a set of key switches. A chord is "entered" by using the key switches comprising the chord in combination.

Two-handed, ten-key chord keyboards having one two-state key switch per digit are known. These can overcome the disadvantages and counter all the advantages of the standard computer keyboard. Chord systems have traditionally been focused on the disadvantages of the qwerty keyboard and overcoming the difficulties of chord systems. Chord systems until now however, have not (or insufficiently) countered the advantages of the qwerty keyboard and, more recently, the advantages of the standard computer keyboard.

The crucial advantage of chord keyboards over non-chord keyboards is that chord keyboards do not require movement of fingers between keys. The basic principle of non-chord keyboards is one key for each symbol. This makes designing such keyboards relatively easy. The basic principle of chord keyboards is assigning more than one key to each symbol. This makes designing chord keyboards relatively difficult. Chord keyboard designers in the past have failed to take into account one or more important principles in designing a chord keyboard.

A one chord system is shown in U.S. Pat. No. 5,900,864 to Macdonald, May 4, 1999. It has no fixed standard chord assignments for the symbols found on the standard computer keyboard. This makes learning the assignments difficult, and consequently makes efficient input difficult. The visual representation of chords is not intuitive and self-explanatory. The letters of the alphabet are presented in an array of rows and columns. Presentation in rows and columns with a two-handed chord keyboard has the disadvantage that a user can not map the visual presentation of the letters directly and unchanged to the physical position of the hands and digits on the keyboard. Consequently, it is not easy to quickly see, memorize, or visualize the two digits corresponding to a letter. As a result, it is impossible to efficiently input text without first memorizing letter chords. The chord keyboard is connected through the parallel port of a computer, making the hardware unnecessary non-standard and thus expensive.

Another chord system is shown in U.S. Pat. No. 5,642,108 to Gopher et al., Jun. 24, 1997. It includes a two-handed chord keyboard with fourteen keys. Symbols are entered with one-handed chords only, which limits the number of easily entered chords. A limited use of a color-code is made to visually represent and distinguish keys. Namely, the colors gray, red, and blue are used for three keys operated by each thumb. This system has several disadvantages. Operation of several keys by one digit is error-prone. Chords are visually represented as a column of five squares representing the digits, which is not a compact representation. The alphabetic presentation of letters and the assignment of chords to letters does not provide any aid to help the user remember chords corresponding to letters, besides simply showing the assignment. Consequently, the user first has to memorize the letter chords to input text somewhat efficiently. That is, without looking up the chord for every letter alphabetically, which is slow. The chord keyboard contains non-standard and thus expensive electronic circuitry. The chord keyboard is bulky and not flat like a standard computer keyboard, making it difficult to carry or to build into a laptop.

Another chord system is shown in U.S. Pat. No. 5,535,421 to Weinreich, Jul. 9, 1996. Weinreich presents symbols in an array of ten rows and ten columns.

A symbol is selected by first selecting a row and second selecting a column, which is slow. The large size of the array makes it difficult to quickly see in which row and column a symbol is located. The large size of the array also makes it difficult to remember the position of symbols in the array. A user can not map the visual presentation of the symbols directly to individual digits. Consequently, it is not easy to quickly see, memorize, or visualize the digits corresponding to a letter.

Weinreich shows a standard computer keyboard used as a chord keyboard. A chord keyboard connected through a connector attached to a standard computer keyboard, using its electronic hardware to encode key switch events, is mentioned. This has the disadvantage that both a standard computer keyboard and a chord keyboard are needed, which is expensive and awkward. It is not recognized that the standard computer keyboard is better suitable to cheaply introduce a chord system because it is widely available to potential users. The importance of positioning keys on specialized custom-made and average-sized chord keyboards is mentioned. These keyboards have the disadvantages that custom-made chord keyboards are expensive to produce and that average-sized chord keyboards do not fit all users optimally.

A chord system with a two-handed, ten-key chord keyboard is shown in U.S. Pat. No. 5,189,416 to Estes, Feb. 23, 1993. A chord entered is processed to a keycode using a controller coupled to ten key switches and two sets of ten bit-registers. A keycode consists of ten bits representing the keys making up the chord. The keycodes are ordered in a so-called "primary reflected Gray code sequence", so they can be associated with a sequential character set. The primary reflected Gray code sequence is said to have an intuitive repeating pattern, which is by no means clear. Many symbols, for example command symbols of the standard computer keyboard, can not be put in a logical sequence. No provision is made for occasional users; users are required to memorize or have memorized the chord sequence as well as the character sequence.

Crews, in U.S. Pat. No. 5,017,030, May 21, 1991 combines ten home keys to input the alphabet and the numerals by entering chords, with many regular non-chord keys for punctuation and other characters. The keyboard requires error-prone digit movement to keys. Not all frequently used symbols of the standard computer keyboard are present. For example, there is no Alt symbol. More fundamentally, it is impossible to modify certain letters, for example, combining the Control key with the letter F or O. As a result the keyboard is incompatible with software written for the standard computer keyboard. The alphabet is mapped alphabetically to the home keys of the keyboard. This has a serious drawback, namely that letters most frequently used are not assigned the easiest chords. An operator using the keyboard to input text is not able to see the letters with which the home keys are marked, since all letters are hidden by the ten digits.

Crews' keyboard comprises slidable keys and palm pads as operational components. Such exotic hardware used on top of introducing chording will severely hinder acceptance by standard computer keyboard users. The keyboard contains specialized electronic and mechanical hardware, making it expensive. The keyboard is inflexible both in functional design and construction. The character set is fixed and can not be modified or extended. The electronic hardware is tailored to the functional design. The home keys are elongated in the direction of the digits to accommodate hands of various sizes. Smaller hands will, however, have trouble reaching for the many non-home keys. A limited variation of hand sizes is thus supported. Children (with small hands) are important potential users when it comes to the acceptation of a new manual input system.

My prior copending application, supra, shows a chord keyboard, which presents letters alphabetically with their color-coded chord representations. While this keyboard makes it easy to look up letters, it is not as efficient as the present invention because it also requires look up (or prior memorization) of the keys represented by colors of the color-coded chord representations. Also, the presentation of the letters does not assist memorization of the assignment of chords to letters.

BACKGROUND OF THE INVENTION—OBJECTS AND ADVANTAGES

Accordingly, several objects and advantages of my invention are:

to provide a compact, intuitive, self-explanatory, easy-to-use, easy-to-learn, efficient, accurate, and powerful alphanumeric input system for character input, command input, and modified character input;

to provide an input system which prevents typing errors, by requiring no finger movement between keys;

to provide an input system which is easy-to-use for first-time users;

to provide an input system which can be used relatively efficiently by memorizing the easy-to-learn positions of orderly arranged letters;

to provide an input system which is easy-to-learn to operate efficiently and which users gradually learn to operate really efficiently;

to provide an input system which is ergonomically designed, by assigning easier entered chords to more frequently used symbols and giving the stronger fingers a higher workload;

to provide an input system which prevents accidental input of commands and modified characters during character input to result in problematic and potentially confusing input;

to provide an input system which includes a permanently-visible, intuitive, self-explanatory, compact, logically-structured presentation of the fixed assignment of chords to the symbols found on the standard computer keyboard;

to provide an input system which is compact, flat, and easy to carry, and which thus can be embodied in a single mobile input device which can be used for input to several devices normally used with different standard computer keyboards, overcoming network externalities;

to provide an input system which is compatible with the standard computer keyboard, overcoming hardware and software lock-in; and to provide an input system which is inexpensive to manufacture, since it uses the same electronic hardware as the standard computer keyboard.

Further objects and advantages of my invention will become apparent from a consideration of the drawings and ensuing description.

SUMMARY

According to the present invention, I provide a computer-compatible manual input system for efficient generation of inputs by entering chords, or combinations of keys. A legend shows symbol arrays, rows of which represent digits involved in chords or a specific type of chord, enabling determination of chords through visualizing the position of symbols. Chords are represented by combinations of digit-representing colored areas, which resemble a digit or colored key. In the preferred embodiment, a keyboard has only ten colored keys, one for each digit.

DRAWINGS—FIGURES

DRAWINGS—REFERENCE NUMERALS

Figure 1:
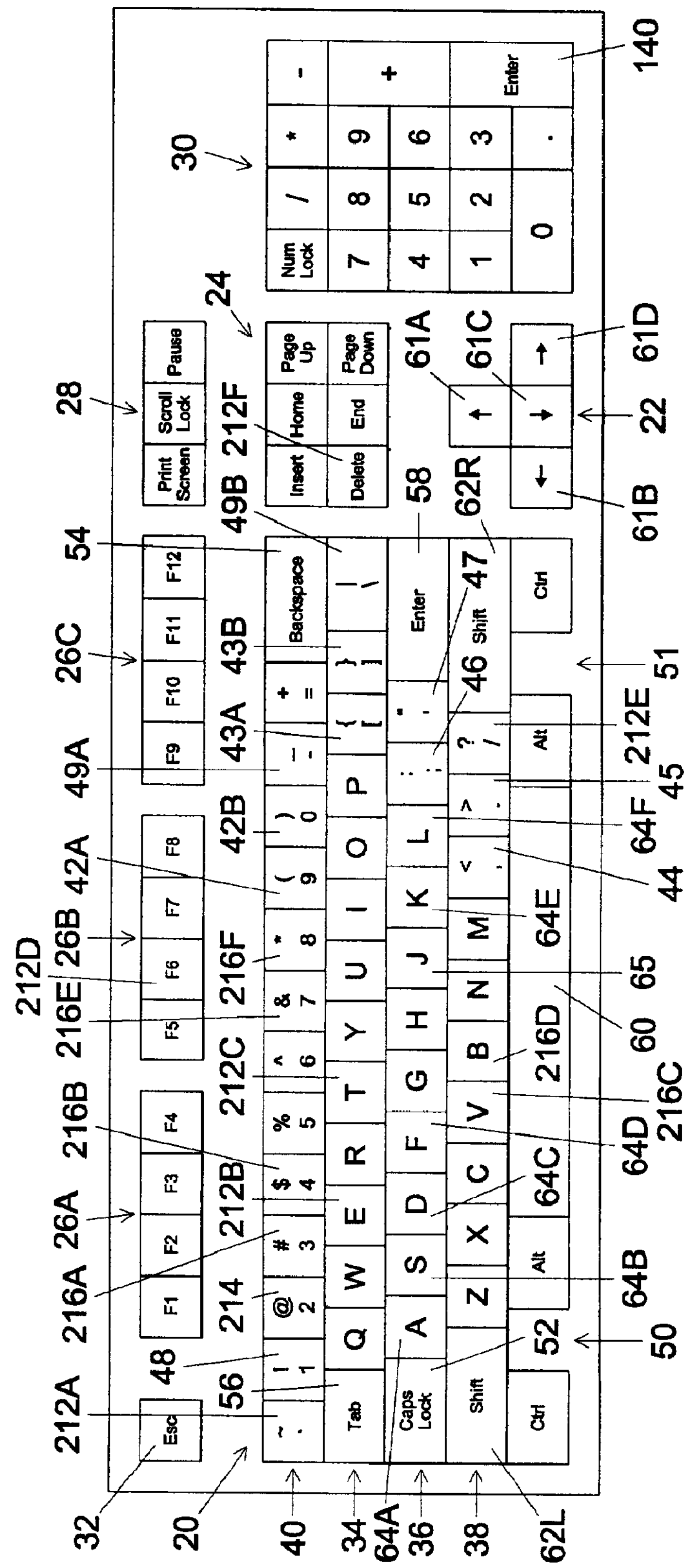
FIG. 1 (prior art) shows the layout of the keys on the U.S. version of the standard computer keyboard.

20 main keypad
22 arrow keypad
24 command keypad
26A to 26C function keypads
28 command keypad
30 number keypad
32 Esc key
34 top row of letter keys
36 middle row of letter keys
38 bottom row of letter keys
40 top row of main keypad
42A and 42B keys with pair of brackets used for chording
43A and 43B keys with two pairs of brackets
44 key with bracket of pair and punctuation mark of pair
45 key with bracket, punctuation mark, and wired like keyboard 66 key
46 home key with pair of punctuation marks
47 key with pair of punctuation marks
48 key with similar looking character pair used for chording
49A and 49B keys with pair of similar looking characters
50 left group of modifier keys
51 right group of modifier keys
52 Caps Lock key
54 Backspace key
56 Tab key
58 Enter key
60 space bar
61A to 61D arrow keys
62L left Shift key
62R right Shift key
64A to 64F home keys
65 home key
66 keyboard of the preferred embodiment
68 input system software
70 main unit of PC
72 keyboard cable
74 pink key
76 red key
78 orange key
80 yellow key
82 white key
84 black key
86 green key
88 blue key
90 purple key
92 brown key
94 pullout legend
96 alphabet section
98 non-alphabet section
100 array
102L left single-hand group
102R right single-hand group
104 middle column
106 modifier group
108L left sign group
108R right sign group
110L left bracket group
110R right bracket group
112L left command group
112R right command group
114L left movement group
114R right movement group
116 numeral group
118 left little finger column
120 left ring finger column
122 left middle finger column
124 left index finger column
126 right index finger column
128 right middle finger column
130 right ring finger column
132 right little finger column
134L left top row
134R right top row
136L left middle row
136R right middle row
138L left bottom row
138R right bottom row
140 Enter key of keypad 30
142L left colored-area group

142R right colored-area group
144L left colored letter row
144R right colored letter row
146L left colored letter row
146R right colored letter row
148 chord representation
150 symbol-chord pair
152 chord representation
154 chord representation
182 right underarm
184 finger tip
186 elbow tip
188 upper arm
190 shoulder tip
192 chest half
194 body center
196 middle of keyboard
198 angle
200 right-angled triangle
202A and 202B matrix input lines
204 matrix output line
206 matrix output line
208A to 208C keys of rectangle
210 key of rectangle
212A to 212F keys wired like keyboard 66 keys
214 key wired like keyboard 66 key and used for chording
216A to 216F keys used instead of keyboard 66 keys

DETAILED DESCRIPTION—KEYS AND SYMBOLS OF STANDARD COMPUTER KEYBOARD—FIG. 1

The present invention is modeled on the standard computer keyboard. Consequently, a detailed description of the standard computer keyboard will make it easier to understand the present invention.

Layout of Standard Computer Keyboard

FIG. 1 shows the layout of the keys on the U.S. version of a standard computer keyboard, which has 101 keys. The keyboard is about 50 cm wide, 15 cm deep, and 3 cm thick. The keys of the keyboard are grouped in a main keypad 20, an arrow keypad 22, a command keypad 24, three function keypads 26A to 26C, a command keypad 28, and a number keypad 30. A key 32 marked Esc is solitary. The keys are marked with symbols of several types, namely characters, modifiers, locks, commands, arrows, and functions.

Keypad 20 comprises characters, modifiers, a lock, and commands. The characters are arranged in two main groups, the letters of the alphabet and key-sharing characters. The letters are A to Z. The letters are arranged in a top row 34, a middle row 36, and a bottom row 38 in a block of adjacent keys in a seemingly random fashion called the qwerty layout, after the first six lettered letters of row 34.

Key-sharing characters comprise numerals, brackets, punctuation marks, and miscellaneous characters. Key-sharing characters are the only symbols of keypad 20, which share a key. The numerals are 1 to 9, and 0. The numerals are arranged in their natural order from left to right in a row 40 on adjacent keys, with 0 following 9 instead of preceding 1.

The brackets are ( (left paren), ) (right paren), { (left brace), } (right brace), [ (left bracket), ] (right bracket), < (left angle bracket), and > (right angle bracket). The brackets are arranged in corresponding pairs on adjacent keys 42A and 42B, 43A and 43B, and 44 and 45. The punctuation marks are ! (exclamation mark), ' (backquote), – (hyphen or minus sign), : (colon), " (double quote), ; (semicolon), ' (single quote), ? (question mark), , (comma), and . (period). Brackets and most punctuation marks are grouped around the right side of the letters of the alphabet on keypad 20. Some of the punctuation marks are arranged in similar pairs on same keys 46 and 47, namely colon and semicolon, and double quote and single quote, or on adjacent keys 44 and 45, namely comma and period. The exclamation mark is arranged in a similar looking pair on a key 48 with the numeral 1.

The miscellaneous characters are ~ (tilde), @ (at sign), # (number sign), $ (dollar sign), % (percent sign), ^ (caret), & (ampersand), * (asterisk), _(underscore), + (plus sign), = (equal sign), | (vertical bar), \ (backslash), and / (slash). Most miscellaneous characters are in row 40. The underscore, vertical bar, and backslash are arranged in similar looking pairs on keys 49A and 49B. The other miscellaneous characters are arranged in a seemingly random fashion.

The modifiers are Shift, Ctrl, and Alt. Each modifier is present on one key in each of a left group 50 and a right group 51 of three modifier keys. The lock is Caps Lock, it is on a key 52 adjacent to group 50. The commands are Backspace, Tab, and Enter. Backspace is on a key 54 in the right upper corner of keypad 20, Tab is on a key 56 on the left side of keypad 20, and Enter is on a key 58 on the right side of keypad 20. A bar 60 is not marked with a symbol. Not shown in FIG. 1 are redundant non-textual markings, mainly arrows, on keys 62 marked Shift and keys 54, 56, and 58 marked Backspace, Tab, and Enter.

Keypad 22 comprises arrow keys 61A to 61D. Key 61A at the top is marked with an upward pointing arrow, key 61B on the left with a left pointing arrow, key 61C in the middle with a downward pointing arrow, and key 61D on the right with a right pointing arrow. Keypad 24 comprises six keys marked with a command, ordered in pairs of related commands. The command pairs are Insert and Delete, Home and End, and Page Up and Page Down.

Keypads 26A to 26C comprise twelve function keys marked with the functions F1 to F12. The functions are arranged in their natural order from left to right. Keypad 28 is hardly ever used and can be ignored in the description of the present invention. Keypad 30 makes up a wholly redundant area of the keyboard. Thus discussion of its keys is unnecessary.

Not shown in FIG. 1 are three lock indicators. Of these three only one marked Caps Lock is of interest. If this indicator is on, the keyboard is in Caps Lock mode, if the indicator is off, the keyboard is not in Caps Lock mode.

Behavior of Standard Computer Keyboard

In the following only the regular behavior of the standard computer keyboard is discussed, since it is important in understanding the manual input system of the present invention.

Pressing a key results in an input to the active task running on the computer. For example, if a word processor is the active task, then pressing a letter key inputs that letter to the word processor. The lock keys and modifier keys are an exception. Pressing a lock key or a modifier key does not result in an input to the active task running on the computer. Lock keys toggle between two states. For example, if Caps Lock key 52 is pressed, the keyboard switches on Caps Lock mode, or if the keyboard is in Caps Lock mode, Caps Lock mode is switched off. If the keyboard is not in Caps Lock mode, pressing a letter key inputs a lowercase letter corresponding to the uppercase letter with which it is marked. If the keyboard is in Caps Lock mode, pressing a letter key inputs the (uppercase) letter with which it is marked. Keys marked with two symbols input the lower symbol. Bar 60 inputs a space. All other keys input the symbol with which they are marked. Function keys also input the function with which they are marked. Functions input to the active task running on the computer are intended to be translated by the active task to something else.

Modifier keys are used in combination with other keys. Generally only one modifier key is used in combination with one non-modifier key. If the keyboard is not in Caps Lock mode and one of keys 62 is held down, pressing a letter key inputs the (uppercase) letter with which it is marked. If the keyboard is in Caps Lock mode and one of keys 62 is held down, pressing a letter key inputs a lowercase letter corresponding to the uppercase letter with which it is marked. If one of keys 62 is held down, pressing a key marked with two symbols inputs the upper symbol. In all other cases, if a modifier key is held down, pressing a non-modifier key inputs a combination of the modifier symbol and the non-modifier symbol.

If pressing a key inputs a symbol, then holding down the key after it has been pressed inputs the symbol repeatedly. Repetition starts after an initial period and continues until the key is released. This feature is called "auto-repeat". It is also referred to as "typematic rate".

Manual Operation of Standard Computer Keyboard

The standard computer keyboard is designed for operation by ten digits. Many operators of the keyboard use only the two index fingers to operate the keyboard. Operation by two fingers (hunt-and-peck operation) requires less skill in the hand operation of the keyboard than operation by ten digits. Operation by two fingers also makes searching for symbols easier. However, two-finger operation is inefficient. Ten-digit operation is reasonably efficient, but requires considerable skill in the hand operation of the keyboard, as well as memorization of the position of most keys on the keyboard. Ten-digit operation will now be discussed further.

The thumbs are initially positioned on space bar 60 and the fingers on eight so-called home keys 64A to 64F, 65, and 46. Between pressing of keys, fingers return to their initial position. An exception is the prolonged use of keypad 22, keypad 24, or keypad 30, which requires prolonged relocation of the right hand. From the initial position, space bar 60 and keys 64A to 64F, 65, and 46 are most easily operated, since they require no finger repositioning.

Keys adjacent to keys 64A to 64F, 65, and 46 require a finger to move a relatively short distance to be positioned and are thus relatively easy to operate. Keys 64A to 64F, 65, and 46 and keys adjacent to them are marked with the twenty-six letters of the alphabet, Caps Lock, Shift, and six key-sharing characters comprising the punctuation marks, except three, namely backquote, exclamation mark, and hyphen. These keys thus enable the operator to enter English text relatively easy.

The remaining keys on keypad 20 are difficult to operate, particularly the remaining modifiers since they must be pressed in combination with other keys. The modifiers are located close to one another in groups 50 and 51, which easily leads to problematic and potentially confusing typing errors. One major problem occurs when an operator inadvertently inputs Ctrl or Alt during character input instead of Shift: this often leads to confusing input of modified characters. And also accidentally inputting Caps Lock, switching Caps Lock mode on or off, often leads to a subsequent sequence of unintended inputs. Backspace key 54, frequently used to delete text, is also very difficult to operate. Important keys 54, 56, 52, 58, and 62 on keypad 20 have a larger surface, making them somewhat easier to operate than other keys. Keys on other keypads 22, 24, 26, 28, and 30 require a hand to be moved back and forth over a considerable distance, which is very inefficient.

Figure 2:
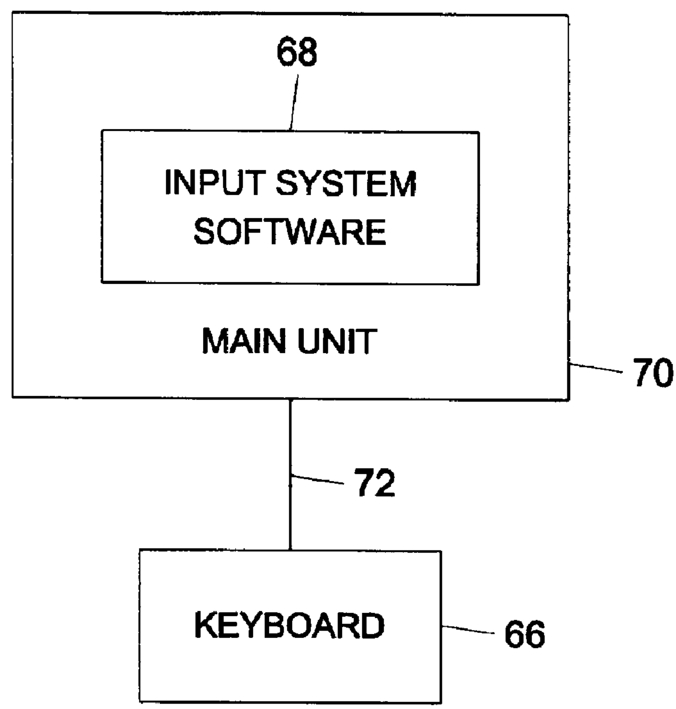
FIG. 2 illustrates the preferred embodiment of a manual input system according to the invention.

Description of Manual Input System—FIG. 2

FIG. 2 illustrates the preferred embodiment of a manual input system according to the invention. It comprises a keyboard 66 and input system software 68 running on a main unit 70 of a PC. Keyboard 66 is connected to main unit 70 by a keyboard cable 72. Software 68 will be described below and a listing of the software is provided in the Appendix.

Keyboard 66 preferably has a gray casing similar to a standard computer keyboard, but is less wide and deep. The top surface of the casing preferably has the following dimensions: 19.4 cm wide and 12.55 cm deep. The thickness of the casing of keyboard 66 preferably is approximately 1 cm.

Important Principles in Designing a Chord Keyboard

Keyboard 66 is designed according to important principles in designing a chord keyboard. As stated in the prior art section, chord keyboard designers in the past have failed to take into account one or more important principles in designing a chord keyboard.

The following are, in order of importance, important principles in designing a chord keyboard for alphanumeric input:

1. The keyboard must be intuitive, self-explanatory, and easy-to-operate. A first-time user must be able to start using the keyboard immediately without any help.
2. Every digit must operate only one key, to avoid movement between keys.
3. Each symbol must be assigned as few keys as possible, to keep it simple.
4. Every digit must be utilized, to maximize the number of possible chords.
5. The presentation of the assignment of chords to letters must enable the user to input text relatively efficient without any training or learning of chords.
6. The assignment of chords to symbols must be fixed and permanently shown.
7. The presentation of the assignment of chords to symbols must be intuitive, self-explanatory, and compact.
8. Each type of symbol must correspond to a specific type of chord, for conceptual simplicity.
9. The symbols and chords in the presentation of the assignment must be grouped according to type and logically ordered, for easy look up and easy memorization.
10. Frequently used symbols must be easier to input.
11. The different capabilities of each digit must be taken into account.
12. Remembering the position of a symbol on the keyboard must make it easier for the user to input the symbol, as on the standard computer keyboard.
13. The major distinction in types of digits, namely between fingers and thumbs, must be used to divide chords in two groups corresponding to a major distinction in types of symbols, for example between characters and commands.
14. The division in digits between the left and right hand must be used.

Figure 3:
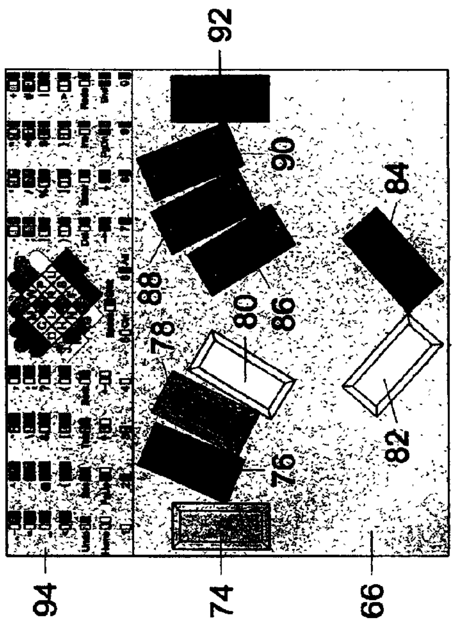
FIG. 3 shows the layout of the preferred embodiment of a keyboard of the invention.

FIG. 3—Layout of Keyboard 66—Short Description

FIG. 3 shows the layout of a keyboard 66 scaled-down to about 40 percent of its preferred actual dimensions in accordance with one presently preferred embodiment of the invention. Keyboard 66 basically comprises only ten colored keys 74, 76, 78, 80, 82, 84, 86, 88, 90, and 92, which are colored as follows: pink, red, orange, yellow, white, black, green, blue, purple, and brown. Keyboard 66 has a pullout legend card 94 (legend) presenting the assignment of chords to symbols. Legend 94 can be pushed into the casing of keyboard 66 for transportation or if legend 94 is no longer being used. Keys 74, 76, 78, 80, 82, 84, 86, 88, 90, and 92 are arranged such that each key can be operated by a different digit of a human operator's hands. Keyboard 66 accommodates all potential human operators, including children. The colors of keys 74, 76, 78, 80, 86, 88, and 90, are ordered like the colors of the rainbow. Finger keys 74, 76, 78, 80, 86, 88, 90, and 92 have real colors, and thumb keys 82 and 84 are white and black. Left-hand keys 74, 76, 78, 80, and 82 have light colors, and right-hand keys 84, 86, 88, 90, and 92 have dark colors.

Figure 4:
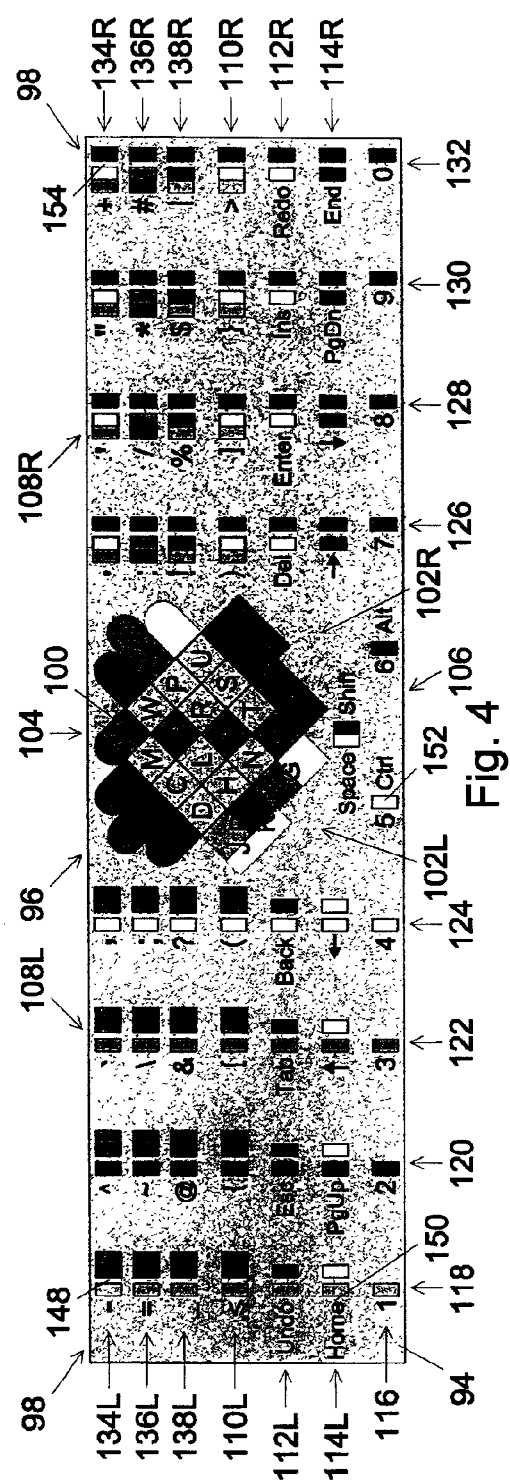
FIG. 4 shows an assignment of chords to symbols according to the invention.

FIG. 4—Presentation of Assignment of Chords to Symbols—Short Description

FIG. 4 shows legend 94 in its actual preferred dimensions: 19.4 cm wide and 5 cm deep. Legend 94 presents the assignment of chords to symbols. Legend 94 has a gray background color. Legend 94 comprises an alphabet section 96 and a non-alphabet section 98. The letters of the alphabet are presented in alphabet section 96. The other symbols are presented in non-alphabet section 98. Particular types of symbols are assigned specific (matching) types of chords. For example, letters are assigned two-finger chords, that is chords that involve exactly two fingers.

Presentation of Assignment of Chords to Letters—Short Description

Alphabet section 96 presents the assignment of chords to letters of the alphabet. The letters of the alphabet are assigned a specific matching type of chords, namely chords involving two fingers. The assignment of chords to letters is based on ease-of-entering of chords, letter frequency in American English, the distinction between vowels and consonants, and the order of letters in the alphabet.

Alphabet section 96 comprises an array 100, a left single-hand group 102L, and a right single-hand group 102R. Array 100 comprises sixteen letters assigned chords involving one finger of each hand. Left single-hand group 102L comprises five letters assigned chords involving two fingers of the left hand. Right single-hand group 102R comprises five letters assigned chords involving two fingers of the right hand.

Letters in array 100 are arranged in four diagonal rows representing the four fingers of the operator's left hand and four diagonal rows representing the four fingers of the operator's right hand. Each letter in array 100 is assigned the chord involving the two fingers corresponding to the two rows of the letter. For example, the letter I at the top of array 100 is assigned the chord involving the two little fingers. Array 100 comprises sixteen frequently occurring letters. A middle column 104 comprises four frequently occurring vowels, which are assigned chords involving corresponding fingers of the left hand and the right hand. Single-hand groups 102 show each letter with a background of two colors. The two background colors of each letter represent the two fingers involved in the chord assigned to the letter. In single-hand groups 102 letters adjacent to array 100 correspond to chords involving adjacent fingers.

The eleven letters to the left of column 104 are from the first part of the alphabet. The eleven letters to the right of column 104 are from the last part of the alphabet. The four vowels in column 104, the six letters in array 100 to the left of column 104, and the six letters in array 100 to the right of column 104 are ordered on letter frequency. That is, more frequently occurring letters are assigned chords that are easier to enter. In single-hand groups 102 letters adjacent to array 100 occur more frequently than letters not adjacent to array 100, and letters in each row are ordered alphabetically.

Presentation of Assignment of Chords to Non-Alphabet Symbols—Short Description

Non-alphabet section 98 presents the assignment of chords to non-alphabet symbols. Symbols and their assigned chords are represented by symbol-chord pairs. The symbol-chord pairs comprise a modifier group 106, sign groups 108L and 108R, bracket groups 110L and 110R, command groups 112L and 112R, movement groups 114L and 114R, and a numeral group 116. The symbol-chord pairs are mainly arranged in eight finger columns 118, 120, 122, 124, 126, 128, 130, and 132, each representing one finger. Chords represented in each column involve the finger represented by the column. Chords represented in the left half of non-alphabet section 98 are pairwise related to chords represented in the right half of non-alphabet section 98. Chord pairs form each other's mirror image by exchanging corresponding left hand and right hand digits.

Short Description of Modifier Group 106

Modifier group 106 is located directly below alphabet section 96, since modifiers are usually used in combination with letters. Chords of modifier group 106 involve one or two thumbs. Modifier group 106 is arranged similarly to the arrangement of the symbols of group 50 of the standard computer keyboard.

Short Description of Sign Groups 108

Sign groups 108 map punctuation marks and miscellaneous characters to chords involving one finger of one hand and two adjacent fingers of the other hand. Sign groups 108 comprise top rows 134L and 134R, middle rows 136L and 136R, and bottom rows 138L and 138R. Each row comprises chords with a particular subchord involving two adjacent fingers. The arrangement of symbols of sign groups 108 is highly structured. For example, punctuation marks are mapped to chords involving at least one index finger, and are accordingly in rows 134 and columns 124 and 126. As another example, sign groups 108 contain many pairwise-related symbols mapped to chord pairs with mirror symmetry, such as, comma and period, single quote and backquote, and minus sign and plus sign.

Short Description of Remaining Groups 110, 112, 114, and 116

Bracket groups 110 map brackets to chords involving one finger of one hand, and an index finger and a little finger of the other hand. Left brackets are in left columns 118, 120, 122, and 124 and pairwise-related right brackets are in right columns 126, 128, 130, and 132. Chords of command groups 112 involve a finger of one hand and a thumb of the other hand. Command groups 112 comprise miscellaneous commands among which are pairwise-related commands, namely Back and Del, and Undo and Redo. Chords of movement groups 114 involve a finger and a thumb of a particular hand. Movement groups 114 comprise pairwise-related cursor movement commands, which move the text cursor in a word processor like Microsoft Word. Numeral group 116 maps numerals to chords involving one digit. The numeral group is ordered in the same way as the numerals on the standard computer keyboard.

Detailed Description—Layout of Keyboard 66—FIG. 3

The ten keys 74, 76, 78, 80, 82, 84, 86, 88, 90, and 92 are arranged such that each key can be operated by a different digit of a human operator's hands. Keys 74, 76, 78, 80, 82, 84, 86, 88, 90, and 92 are similar in shape to a key 140, marked Enter, on keypad 30 (FIG. 1) of the standard computer keyboard. The arrangement and shape of keys 74,

76, 78, 80, 82, 84, 86, 88, 90, and 92 accommodates all potential human operators, including children. Pink key 74 is operated by the left little finger, red key 76 by the left ring finger, orange key 78 by the left middle finger, yellow key 80 by the left index finger, white key 82 by the left thumb, black key 84 by the right thumb, green key 86 by the right index finger, blue key 88 by the right middle finger, purple key 90 by the right ring finger, and brown key 92 by the right little finger. The colors of keys 74, 76, 78, 80, 86, 88, and 90, are ordered like the colors of the rainbow, i.e., pink, red, orange, yellow, green, blue, and purple. Finger keys 74, 76, 78, 80, 86, 88, 90, and 92 have real colors, pink, red, orange, yellow, green, blue, purple and brown, and thumb keys 82 and 84 are white and black. Left-hand digit keys 74, 76, 78, 80, and 82 have light colors, pink, red, orange, yellow, and white, right-hand digit keys 84, 86, 88, 90, and 92 have dark colors, black, green, blue, purple, and brown.

FIG. 4—Presentation of Assignment—Detailed Description

As shown in FIG. 4, legend 94 presents the assignment of chords to symbols. Legend 94 comprises alphabet section 96 and non-alphabet section 98. The letters of the alphabet are presented in alphabet section 96. The other symbols are presented in non-alphabet section 98. Particular types of symbols are assigned specific (matching) types of chords. For example, letters are assigned two-finger chords, that is chords that involve exactly two fingers.

Presentation of Assignment of Chords to Letters—Detailed Description

Alphabet section 96 presents the assignment of chords to letters of the alphabet. The letters of the alphabet are assigned a specific matching type of chord, namely chords involving two fingers. Of the twenty-eight chords comprising two finger keys, twenty-six are assigned to a letter. Two chords are too difficult to enter and are not used; they would involve a middle finger and a little finger of a particular hand.

The assignment of chords to letters is based on chord types, ease-of-entering of chords, the visual presentation of the two-finger chords, letter frequency in American English, the distinction between vowels and consonants, and the order of letters in the alphabet.

Chord Types and Ease-of-entering of Chords Involving Two Fingers—Detailed Description Ease-of-entering of chords involving two fingers is determined in two steps. First the chords are divided in four groups of chord types. Second the groups and the chords within the groups are ranked on ease-of-entering. The result in decreasing order of ease-of-entering is shown in Tables 1, 2, 3, and 4.

TABLE 1

Rank order of chords involving corresponding fingers of the hands based on ease-of-entering

| Left hand | | | | Right hand | | | | Colors of |
|---|---|---|---|---|---|---|---|---|
| L | R | M | I | I | M | R | L | keys of chord |
| | | | X | X | | | | Yellow + Green |
| | | X | | | X | | | Orange + Blue |
| | X | | | | | X | | Red + Purple |
| X | | | | | | | X | Pink + Brown |

Table 1 shows the first group, comprising the chords easiest to enter, the chords involving corresponding fingers of the left hand and the right hand. The chords in Table 1 form the group of easiest entered chords, because they involve only one finger of each hand and the fingers are corresponding fingers.

TABLE 2

Rank order of chords involving one finger of each hand (excluding corresponding fingers) based on ease-of-entering

| Left hand | | | | Right hand | | | | Colors of |
|---|---|---|---|---|---|---|---|---|
| L | R | M | I | I | M | R | L | keys of chord |
| | | | X | | X | | | Yellow + Blue |
| | | X | | X | | | | Orange + Green |
| | | | X | | | X | | Yellow + Purple |
| | X | | | X | | | | Red + Green |
| | | X | | | | X | | Orange + Purple |
| | X | | | | X | | | Red + Blue |
| | | | X | | | | X | Yellow + Brown |
| X | | | | X | | | | Pink + Green |
| | | X | | | | | X | Orange + Brown |
| X | | | | | X | | | Pink + Blue |
| | X | | | | | | X | Red + Brown |
| X | | | | | | X | | Pink + Purple |

Table 2 shows the second group, the chords involving one finger of the left hand and one finger of the right hand, excluding the chords shown in Table 1. The chords in Table 2 form the group of next easiest entered chords, because they involve only one finger of each hand.

TABLE 3

Rank order of chords involving adjacent fingers of a particular hand based on ease-of-entering

| Left hand | | | | Right hand | | | | Colors of |
|---|---|---|---|---|---|---|---|---|
| L | R | M | I | I | M | R | L | keys of chord |
| | | | | X | X | | | Green + Blue |
| | | X | X | | | | | Orange + Yellow |
| | | | | | X | X | | Blue + Purple |
| | X | X | | | | | | Red + Orange |
| | | | | | | X | X | Purple + Brown |
| X | X | | | | | | | Pink + Red |

Table 3 shows the third group, the chords involving adjacent fingers of a particular hand. The chords in Table 3 form the group of next easiest entered chords, because they involve adjacent fingers.

TABLE 4

Rank order of chords involving two fingers of a particular hand (excluding adjacent keys) based on ease-of-entering

| Left hand | | | | Right hand | | | | Colors of |
|---|---|---|---|---|---|---|---|---|
| L | R | M | I | I | M | R | L | keys of chord |
| | | | | X | | | X | Green + Brown |
| X | | | X | | | | | Pink + Yellow |
| | | | | X | | X | | Green + Purple |
| | X | | X | | | | | Red + Yellow |
| | | | | | X | | X | Blue + Brown |
| X | | X | | | | | | Pink + Orange |

Table 4 shows the fourth group, the chords involving two fingers of a particular hand, excluding the chords shown in Table 3. The chords in Table 4 are the least easy to enter.

Figure 5:
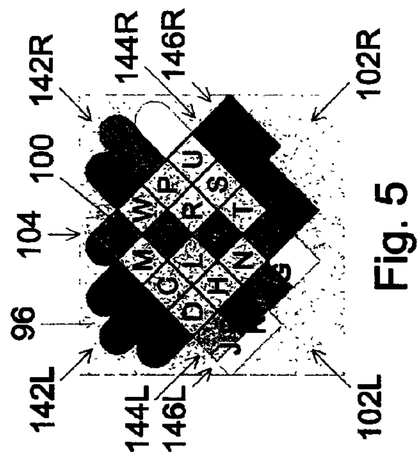
FIG. 5 shows an alphabet section of the assignment of chords to symbols according to the invention.

FIG. 5—Visual Presentation of Two-Finger Chords—Detailed Description

FIG. 5 shows alphabet section 96, the visual presentation of two-finger chords assigned to letters. Alphabet section 96 comprises array 100, left single-hand group 102L, and right single-hand group 102R.

Array 100 comprises sixteen letters assigned chords involving one finger of each hand, corresponding to the chords in Table 1 and Table 2. Left single-hand group 102L comprises five letters assigned chords involving two fingers of the left hand. Right single-hand group 102R comprises five letters assigned chords involving two fingers of the right hand. The chords in single-hand groups 102 correspond to the chords in Table 3 and Table 4.

Letters in array 100 are arranged in four diagonal rows representing the four fingers of the operator's left hand and four diagonal rows representing the four fingers of the operator's right hand. A left colored-area group 142L representing right-hand finger tops and a right colored-area group 142R representing left-hand finger tops, and a left colored letter row 144L and a right colored letter row 144R, indicate to the operator the fingers represented by the rows. Each (letter) position in array 100 represents the chord involving the two fingers represented by its two rows. The four positions in middle column 104 correspond to the chords in Table 1. The other twelve positions in array 100 correspond to the chords in Table 2. Middle column 104 has a dark-gray background. This makes it easy to distinguish between the letters and their specific type of chords in middle column 104 and the other twelve letters in array 100. In addition, the dark-gray background of middle column 104 makes it easy to distinguish the letters to the left side and the letters to the right side of column 104 in array 100 as separate groups.

Groups 102 show each letter with a background of two colors. The two background colors of each letter represent the two fingers involved in the chord assigned to the letter. Groups 102 each comprise two letter rows. Left group 102L comprises left colored letter row 144L and a left colored letter row 146L. Right group 102R comprises right colored letter row 144R and a right colored letter row 146R. Each (letter) position in rows 144 represents the chord involving the two adjacent fingers represented by diagonal rows of array 100 it is between. The positions in rows 144 correspond to the chords in Table 3. Each (letter) position in rows 146 represents a ring or little finger of a particular hand. The positions in rows 146 correspond to the chords in Table 4.

TABLE 5

Letter frequencies in American-English texts (percentages)

| | | | |
|---|---|---|---|
| E | 12.5 | M | 2.5 |
| T | 9.3 | F | 2.3 |
| A | 8.0 | P | 2.0 |
| O | 7.6 | G | 1.9 |
| I | 7.3 | W | 1.9 |
| N | 7.1 | Y | 1.7 |
| S | 6.5 | B | 1.5 |
| R | 6.1 | V | 1.0 |
| H | 5.4 | K | 0.7 |
| L | 4.1 | X | 0.2 |
| D | 4.0 | J | 0.2 |
| C | 3.1 | Q | 0.1 |
| U | 2.7 | Z | 0.1 |

Letter Frequency in American English—Detailed Description

Table 5 shows the frequency of occurrence of letters in "A Standard Corpus of Present-Day Edited American English, for use with Digital Computers." (by W. N. Francis and H. Kucera (Brown University, 1979)), a well-known representative collection of American-English texts. More frequently occurring letters in English are generally assigned chords that are easier to enter. For example, the most frequently occurring letter, E, is assigned the easiest chord to enter, involving the two index fingers. There are three minor deviations from this general rule. First, among the five most frequently occurring letters, there are four frequently occurring vowels, namely E, A, O, and I, which are assigned the chords in Table 1. Middle column 104 comprises these four frequently occurring vowels assigned chords involving corresponding fingers of the left hand and the right hand. Second, letters to the left of column 104 are from the first part of the alphabet, and letters to the right of column 104 are from the last part of the alphabet. Third, the letters in rows 144 and rows 146 are alphabetically ordered in each row.

FIG. 4—Presentation of Assignment to Non-Alphabet Symbols—Detailed Description Non-alphabet section 98 presents the assignment of chords to non-alphabet symbols. Symbols and their assigned chords are represented by symbol-chord pairs. Each symbol-chord pair comprises a symbol and a chord representation. Non-alphabet section 98 comprises sixty-two symbols and fifty-nine chord representations. Three symbols that are not found on the standard computer keyboard, namely Space, Undo, and Redo, are included. Space represents a space, as input by bar 60 of the standard computer keyboard. Undo is intended to undo a previous input. For example, in Microsoft Word Undo can correspond to the first command of the Edit menu. Redo is intended to redo a previous input. For example, in Microsoft Word Redo can correspond to the second command of the Edit menu.

Chord representations consist of colored rectangles resembling the top view of the key. Each colored rectangle represents a key and the digit operating the key. The colored rectangles representing a chord are ordered from left to right in the same order in which the keys they represent are found on keyboard 66. Colored rectangles in chord representations are arranged in one or two groups of one rectangle or two adjacent rectangles, each group representing fingers of a particular hand or thumbs. For example, a chord representation 148 comprises a left pink rectangle and two right adjacent rectangles, a green rectangle and a blue rectangle, which represent the chord comprising pink left-hand finger key 74, green right-hand finger key 86, and blue right-hand finger key 88.

Non-alphabet section 98 maps each symbol to a chord. Within each symbol-chord pair, the chord representation follows the symbol directly to the right, conforming to the standard of reading from left to right. For example, in symbol-chord pair 150 the chord representation, consisting of a pink and a white rectangle, follows the symbol Home to the right. Modifier symbols are an exception and follow the chord representation directly to the right. Modifier symbols are mapped to chords to which two symbols are mapped. For example, the symbol 5 and the modifier symbol Ctrl are mapped to a chord representation 152 representing white key 82. So chord representation 152 is part of two symbol-chord pairs.

Non-alphabet section 98 comprises several groups of symbol-chord pairs, namely modifier group 106, left sign group 108L and right sign group 108R, left bracket group 110L and right bracket group 110R, left command group 112L and right command group 112R, left movement group 114L and right movement group 114R, and numeral group 116. Each group of symbol-chord pairs maps a particular type of symbols to a specific type of chords. Modifier group 106 maps modifier symbols to chords comprising only thumb keys. Sign groups 108 map punctuation marks and miscellaneous characters to chords comprising three finger keys of which two are adjacent keys. Bracket groups 110 map brackets to chords comprising three non-adjacent finger keys.

Command groups 112 map miscellaneous command symbols to chords comprising a finger key of one hand and a thumb key of the other hand. Movement groups 114 map movement command symbols to chords comprising a finger key and a thumb key of a particular hand. Numeral group 116 maps numerals to chords comprising one key. The symbol-chord pairs in sign groups 108 are arranged in three rows. The symbol-chord pairs in bracket groups 110, command groups 112, movement groups 114, and numeral group 116 are arranged in one row.

Arrangement of Symbol-Chord Pairs in Finger Columns—Detailed Description

The symbol-chord pairs are arranged in columns representing fingers. Sign groups 108, bracket groups 110, command groups 112, movement groups 114, and eight symbol-chord pairs of numeral group 116 are arranged in four left finger columns and four right finger columns. The four left finger columns are: left little finger column 118, left ring finger column 120, left middle finger column 122, and left index finger column 124. The four right finger columns are: right index finger column 126, right middle finger column 128, right ring finger column 130, and right little finger column 132. Each finger column comprises chords involving the finger the column represents. The finger represented by each finger column is the sole finger of a particular hand involved in the chords of the column. Each finger column is positioned approximately in line with the key on the keyboard operated by the finger the column represent, column 118 in line with pink key 74, column 120 in line with red key 76, etc. Within each column of columns 118, 120, 122, 124, 126, 128, 130, and 132 the colored rectangles representing the key shared by the chords are arranged vertically in line.

Mirror Symmetry of Left-Half and Right-Half Chords—Detailed Description

In non-alphabet section 98, chords of the left half are pairwise related to chords of the right half. Left-half and corresponding right-half chords form each other's mirror image by exchanging left and right digits. For example, left-half chord representation 148 involving the left little finger, the right index finger, and the right middle finger is the mirror image of a right-half chord representation 154 involving the left middle finger, the left index finger, and the right little finger.

Detailed Description of Modifier Group 106

Modifier group 106 is located directly below alphabet section 96, since modifiers are usually used in combination with letters. Modifier group 106 maps modifiers to chords comprising one or two thumb keys. The modifiers in modifier group 106 are arranged similar to the arrangement of the symbols of group 50 of the standard computer keyboard.

Detailed Description of Sign Groups 108

Sign groups 108 map punctuation marks and miscellaneous characters to chords comprising one finger key of one hand and two adjacent finger keys of the other hand. Sign groups 108 comprise left top row 134L and right top row 134R, left middle row 136L and right middle row 136R, and left bottom row 138L and right bottom row 138R. Each row comprises chords involving a particular subchord of two adjacent keys. The chords of top rows 134 are the easiest to enter, the chords of middle rows 136 the next easiest, and the chords of bottom rows 138 are the least easy.

Punctuation marks are mapped to chords comprising at least one of keys 80 and 86, operated by an index finger, and are accordingly in rows 134 and columns 124 and 126. Sign groups 108 comprise many pairwise-related symbols mapped to chord pairs with mirror symmetry. For example, comma and period, single quote and backquote, and minus sign and plus sign. Thus many symbols in left columns 118, 120, 122, and 124 are pairwise related to symbols in right columns 126, 128, 130, and 132.

The arrangement of symbols of sign groups 108 is extensively logically structured, as follows. The comma and period are mapped to the easiest entered chords comprising two keys each operated by an index finger and one key operated by a middle finger. Two symbols, semicolon and question mark below the comma resemble the comma. The two symbols colon and exclamation mark, are below the period and resemble the period. To the left of the comma the backquote resembles the comma and fits in with other symbols with the word "back", namely backslash (\) and Back. The backquote is pairwise related to the single quote, found right of the period. The double quote consists of two single quotes and is located right of the single quote. The double quote is pairwise related to the caret sign left of the backquote. Since moving left in a text is going back (minus) and moving right in a text is going forward (plus), the hyphen (or minus sign) is in left-most column 118 and the plus sign is in right-most column 132.

Miscellaneous characters in left-most column 118 resemble the hyphen in row 134L. Miscellaneous characters in right-most column 132 resemble the plus sign and are pairwise related to symbols in left-most column 118. In rows 136 the tilde resembles the hyphen, the backslash is located below the backquote, since both contain the word "back" and they resemble each other, the slash is pairwise related to the backslash, and the asterisk sign resembles the plus sign. In rows 138 the ampersand sign is located below the backlash, because it contains a similar line, the percentage sign is located below the slash, because it contains a similar line. The dollar sign is located left of the vertical bar, because it contains a similar line, and the at sign is pairwise related to the dollar sign, since both resemble a letter.

Detailed Description of Bracket Groups 110

Bracket groups 110 map brackets to chords comprising one finger key of one hand and index and little finger keys of the other hand. Left brackets are in left columns 118, 120, 122, and 124. Pairwise-related right brackets are in right columns 126, 128, 130, and 132. Parens are located in columns 124 and 126 below punctuation marks and are mapped to the easiest entered chords, because parens occur frequently in text. Plain brackets are mapped to the easiest entered chords remaining, since plain brackets are more easily accessible on the standard computer keyboard than curly brackets. Curly brackets are next to plain brackets, because they resemble plain brackets more than the final pair of brackets, the angle brackets.

Detailed Description of Command Groups 112

Command groups 112 map miscellaneous commands to chords comprising a finger key of one hand and a thumb key of the other hand. Back and Del are pairwise related and mapped to the easiest entered chords of groups 112, reflecting their frequent use. Back (short for Backspace) is on the left side and Del (short for Delete) is on the right side, which reflects the side of a text cursor on which a character is deleted when the symbol is entered, for example in Microsoft Word. The position of Tab and Enter reflects their position on the standard computer keyboard. Tab key 56 is on the left side and Enter key 58 is on the right side of keypad 20. Undo is on the left side, since it is like Back, which usually also undoes the previous input. Redo is on the right side, since it is pairwise related to Undo. Esc is on the left side, reflecting the position of Esc key 32 on the left side of the standard computer keyboard. Ins (short for Insert) is on the right side, reflecting the position of Insert on the standard computer keyboard, which is part of keypad 24 on the right side of the standard computer keyboard.

Detailed Description of Movement Groups 114

Movement groups 114 map movement commands to chords comprising a finger key and a thumb key of a particular hand. The position of the symbols in movement groups 114 reflects the direction in which a text cursor moves when the symbol is input, for example in Microsoft Word. Symbols that move the cursor back (that is left) in a text are on the left side. Symbols that move the cursor forward (that is right) in a text are on the right side. Symbols on the left side are pairwise related to symbols on the right side. The left arrow and the right arrow are mapped to the easiest entered chords of groups 114, reflecting their frequent use. The up arrow is next to the left arrow and the down arrow is next to the right arrow, so that the four arrows from a group, similar to the arrows on arrow keypad 22 on the standard computer keyboard. Page Up is next to the up arrow, since both move a text cursor upward. Page Down is next to the down arrow, since both move a text cursor downward. Home usually moves a text cursor left to the beginning of a line, and is accordingly at the beginning of movement groups 114. End usually moves a text cursor right to the end of a line, and is accordingly at the end of movement groups 114.

Detailed Description of Numeral Group 116

Numeral group 116 maps numerals to a specific matching group of chords comprising one key. Numeral group 116 is ordered in the same way as the numerals on the standard computer keyboard.

Operation—Behavior of Keyboard 66—FIG. 3

The operation or use of my keyboard is facile and rapid. A chord is entered by pressing and releasing the keys it comprises. Keys may be pressed simultaneously or sequentially. During pressing of keys, some pressed keys may be released. At any time during the pressing of the keys of a chord, at least one key must be kept held down. The chord is entered the moment all keys are released.

For example, the period (orange+yellow+green keys) can be input in several ways as follows:

1. Press and release the orange, yellow, and green keys simultaneously.
2. First, press and hold orange key 78 and green key 86. Second, release orange key 78. Third, press yellow key 80. Finally, release yellow key 80 and green key 86.

Chords involving both finger keys and thumb keys can also be entered by keeping the thumb keys down and releasing all finger keys. For example, the uppercase letter A can be input by pressing white key 82 and black key 84 (Shift), and pressing and releasing orange key 78 and blue key 88. Subsequently, still holding white key 82 and black key 84 down, the uppercase letter B can be input by pressing and releasing pink key 74 and red key 76.

As another example, the right arrow can be input by pressing black key 84, and pressing and releasing green key 86. Subsequently, still holding black key 84 down, the down arrow can be input by pressing and releasing blue key 88.

Entering a chord for a symbol which is also found on the standard computer keyboard results in the same input as pressing the appropriate key or combination of keys to input that symbol on the standard computer keyboard. For example, entering the Esc chord, comprising red key 76 and black key 84, results in the same input as pressing Esc key 32 (FIG. 1) on the standard computer keyboard.

Letters of alphabet section 96 are uppercase, but entering a chord to which a letter is mapped inputs a corresponding lowercase letter.

Entering the Space chord results in a space being input, as input by pressing space bar 60 of the standard computer keyboard.

Entering the Undo or Redo chord results in the corresponding command being input.

Modifier chords are used in combination with character chords. The exception is that modifier chords are not used in combination with numeral chords. Only combinations of one modifier chord and one character chord are used. If the Shift chord is combined with a letter chord the (uppercase) letter is input. If the Ctrl or Alt chord is combined with a character chord, a modified character, that is a combination of the modifier and the character, is input.

Entering a chord corresponding to an input results in a single input. Subsequently pressing the Redo chord and holding the chord down turns on auto-repeat. As on the standard computer keyboard, auto-repeat starts after an initial short time delay.

Manual Operation of Keyboard 66

Keyboard 66 is designed for operation by ten digits. By simultaneous pressing of keys, chords can be entered efficiently. Sequential pressing of keys allows the operator to compose a chord incrementally.

FIG. 4—Usage of Legend 94

Usage of legend 94 involves roughly the following steps. First, the operator inspects legend 94 to become familiar with the presentation of the assignment of chords to symbols. Second, the operator looks up symbols and their assigned chords in legend 94. Third, the operator increasingly memorizes positions of symbols in legend 94. Such memorization can be accomplished by repetitively using keyboard 66. Fourth, the operator visualizes the position of symbols in legend 94 to determine their assigned chords. And finally, the operator memorizes the assignment of chords to the symbols by repetition during operation of keyboard 66.

Self-Explanatory Representation of Digits, Keys, and Chords by Colors

In legend 94, colors are used to show the operator in an intuitive, self-explanatory way which digits correspond to which symbols. By inspecting legend 94 and trying out keyboard 66, the operator can easily find out (without the need of help from others) how digits, keys, and chords are represented in legend 94.

By inspecting alphabet section 96, the operator can see that colored-area groups 142 represent the fingers, that the colors in colored letter rows 144 (FIG. 5) correspond to the colors in colored area groups 142, and consequently that diagonal rows in array 100 represent fingers. Seeing that each letter in array 100 corresponds to two fingers, the operator can find out, by trying the keyboard, that the chords involving two fingers input the letters.

By inspecting single-hand groups 102, the operator can see that each letter has two background colors. The operator can find out, by trying the keyboard, that the chords comprising the two keys with the corresponding background colors input the letters.

By inspecting non-alphabet section 98, the operator can see and find out, by trying the keyboard, that keys and the digits that operate them are represented as colored rectangles and that adjacent rectangles represent fingers of a particular hand or both thumbs.

Correspondence of Symbol Types to Chord Types

By inspecting legend 94 further, the operator can see that symbols and their chords are grouped by symbol type and chord type. The operator can see that each symbol type is assigned a specific (matching) chord type. The operator can easily memorize the chord types corresponding to the symbol types.

Looking Up Symbols in Legend 94

Legend 94 is extensively structured and makes extensive use of mnemonics to assist the operator in looking up and memorizing symbols. As stated, symbols in legend 94 are grouped according to type. When looking up a letter, alphabet section 96 in the center of legend 94 is instantly found. When looking up a symbol in non-alphabet section 98, the operator only has to search the group or the left and right groups, corresponding to the type of the symbol. When looking up a modifier, sign, bracket, non-movement command, movement command, or numeral, the operator only has to search, respectively modifier group 106, sign groups 108, bracket groups 110, command groups 112, movement groups 114, or numeral group 116.

Memorizing the Position of Symbols in Legend 94

People are good at memorizing the position of objects within a group of stationary objects they see repeatedly. Memorization of the position of the objects within the group becomes quicker when the group of objects is smaller, the objects are more logically ordered, and objects within the group are more frequently looked up. Even the position of the letters on the standard computer keyboard (a large, mostly chaotically arranged, single group of letters with widely varying letter frequencies), is relatively easily memorized. As witnessed by the speed with which hunt-and-peck typists find letters.

Looking Up Letters in Alphabet Section 96—FIG. 5

The visual presentation of alphabet section 96 enables the operator to look up a letter quickly. The distribution of the letters in alphabet section 96 over a small almost circular area makes it easy for the operator to look up a letter. When looking for a letter, the operator will probably start looking in array 100, since letters in array 100 are most clearly shown, namely with an even gray background. The sixteen letters in array 100 make up ninety percent of letters in texts on average in American-English texts (Table 5). Searching array 100 first, having a ninety percent chance of success on average, will limit the average search time for a letter. For example, to input the word “example” the operator has to look only once for a letter outside of array 100, namely the letter X.

When inputting letters for the first time an operator should quickly discover that the frequently occurring vowels are in middle column 104. The dark gray background indicates to the operator that middle column 104 is a distinct group. Inspecting the group the operator will probably notice that middle column 104 comprises only vowels. So to look up a consonant the operator only has to look in array 100 left and right of middle column 104.

Having looked up several consonants, the operator will probably notice that letters from the first part of the alphabet are to the left of middle column 104 and that letters from the last part of the alphabet are to the right of middle column 104. From this moment on, the operator looking for a consonant only has to search on one side of column 104. For example, when looking for the letter H, from the first part of the alphabet, the operator has to look only to the left of middle column 104. First the operator can search the six letters in array 100 on one side of column 104, with approximately eighty percent chance of success (Table 5). And if unsuccessful the three characters in one of letter rows 144 on one side of middle column 104 with an additional approximately eighteen percent chance of success (Table 5). And finally in approximately two percent of cases in one of letter rows 146 on one side of column 104.

Memorizing the Position of Letters in Alphabet Section 96

By repeatedly looking up letters in alphabet section 96 the operator can quickly memorize the position of letters within the small subgroups of letters in alphabet section 96.

Since the frequently occurring vowels in middle column 104 make up thirty-five percent of letters on average in American-English texts (Table 5), the operator can quickly memorize the position of the frequently occurring vowels in middle column 104.

The operator can subsequently concentrate on gradually memorizing the letters in array 100 to the left and right of column 104, working upward from very frequently occurring letters at the bottom of array 100 to increasingly less frequently occurring letters. Letters in array 100 to the left and right of column 104 occur frequently, they make up fifty-five percent on average of American-English text (Table 5). The operator is helped in memorizing the position of letters in array 100 by the division of letters between the left and right side of column 104 in letters of the first part of the alphabet and letters of the last part of the alphabet.

Array 100 comprises two letter pairs and two words, which can help the operator to memorize the position of letters in array 100. The first letter pair is MW, one letter being the other letter upside-down. The second letter pair is LR, which can be read as left and right, which corresponds to their position in array 100. The two words are COP and HAS.

Having memorized the letters in array 100 the operator can concentrate on memorizing the letters in rows 144, and finally in rows 146. The letters in rows 144 and 146 are ordered alphabetically in each row to assist the operator in memorizing the position of these relatively infrequently occurring letters.

Visualizing Positions to Determine Chords in Alphabet Section 96

Once the operator knows the position of a letter within a subgroup of alphabet section 96, the operator can easily determine the two fingers involved in the chord corresponding to the letter.

If the letter is in array 100, the operator determines the two fingers corresponding to the letter by visualizing the position of the letter relative to array 100. Since the mapping of array 100 to the fingers of the operator is direct and involves no transformation of array 100 (such as rotation), determining the two fingers corresponding to the letter is very easy and intuitive. For example, by visualizing the position of the letter I at the top of array 100, the operator determines that the two little fingers correspond to the letter I.

If the letter is in one of rows 144, the operator determines the two fingers corresponding to the letter by visualizing the position of the letter in the row (that is left, middle, or right) relative to array 100. For example, by visualizing the position of the letter G on the right of row 144L, the operator determines that the left middle finger and left index finger correspond to the letter G.

If the letter is in one of rows 146, the operator determines one finger corresponding to the letter by visualizing the position of the letter relative to array 100. The operator has to memorize that the other finger is the index finger of the same hand. For example, by visualizing the position of the letter J in row 146R, the operator determines that the left little finger (together with the left index finger) corresponds to the letter J.

Memorizing the Position of Symbols in Groups 106, 108, 110, 112, 114, and 116—FIG. 4

The position of modifiers in modifier group 106 is easily memorized, since there are only three modifiers. In addition, the modifiers are arranged similar to the arrangement of the symbols of group 50 of the standard computer keyboard.

The position of signs in sign groups 108 can relatively easily be memorized, since sign groups 108 are extensively logically structured. All punctuation marks are in rows 134 and/or columns 124 and 126. Symbols resembling the comma, the backslash, and the hyphen are in left sign group 108L. Symbols resembling the period, the slash, and plus sign are in right sign group 108R. Within left sign group 108L and right sign group 108R symbols resembling one another are grouped together. Also, most symbols in left sign group 108L are pairwise related to symbols in the right sign group 108R.

The position of brackets in bracket groups 110 is easily memorized, since left brackets are in left bracket group 110L and right brackets are in right bracket group 110R, and brackets in left bracket group 110L are pairwise related to brackets in right bracket group 110R.

The position of commands in command groups 112 is easily memorized, since commands in left command group 112L usually undo a previous input left of a text cursor or are found on the left side of the standard computer keyboard. Commands in right command group 112R usually do something right of the text cursor or are found on the right side of the standard computer keyboard. And Back and Del, and Undo and Redo are pairwise related.

The position of commands in movement groups 114 is easily memorized, since commands in left movement group 114L move a text cursor back (that is left) in a text, and commands in right movement group 114R move a text cursor forward (that is right) in a text. Commands in left movement group 114L are pairwise related to commands in right movement group 114R. Also, Home is at the beginning of movement groups 114, since it usually moves a text cursor left to the beginning of a line. And End is at the end of movement groups 114, since it usually moves a text cursor right to the end of a line.

The position of numerals in numeral group 116 is instantly memorized, since the numerals are ordered in their natural order in the same way as the numerals on the standard computer keyboard.

Visualizing Positions to Determine Chords in Non-Alphabet Group 98

Once the operator knows the position of a modifier within modifier group 106 the operator can easily determine the thumbs involved by visualizing the position of the modifier relative to the thumbs.

Once the operator knows the position of a symbol within one of sign groups 108, bracket groups 110, command groups 112, or movement groups 114, the operator can easily determine the chord corresponding to the symbol. Knowing the position of a symbol, the operator can determine the sole finger of a particular hand involved in the chord by visualizing the position of the symbol relative to finger columns 118, 120, 122, 124, 126, 128, 130, and 132. Knowing the symbol type, the operator can determine the chord type. Knowing the sole finger of a particular hand involved in the chord and the chord type the operator can determine the chord, with the exception of symbols in sign groups 108. To determine the chord in sign groups 108 the operator also has to know the type of row the symbol is in, that is one of top rows 134, one of middle rows 136, or one of bottom rows 138.

Once the operator knows the position of a numeral within numeral group 116 the operator can easily determine the digit involved by visualizing the position of the numeral relative to the digits.

Memorization of Assignment of Chords to Symbols

The operator will finally memorize the assignment of chords to symbols, in the same way 'blind' typists memorize the keys and symbols of the standard computer keyboard, namely by repetition.

Compatibility with Standard Computer Keyboard

The present manual input system is largely compatible with the standard computer keyboard. Symbols and combinations of symbols that are input in typical use of the standard computer keyboard can also be input with the present manual input system. Combinations of a modifier and a non-character, a modifier and a numeral, and more than one modifier with a symbol can not be input with keyboard 66. All of these combinations are difficult to input with a standard computer keyboard, since the key combinations are difficult to press, and consequently little used. The combination Ctrl, Alt, and Delete (Ctrl-Alt-Delete) is an exception. It is used frequently, for example with Microsoft Windows, precisely because it is difficult to press and thus difficult to press by accident. The combination Ctrl-Alt-Delete is assigned the chord involving all digits except the little fingers, since this chord is difficult to enter by accident and easy to remember. A symbol-chord pair showing the assignment of this chord to Ctrl-Alt-Delete can be shown, for example, on the back of keyboard 66.

Some symbols found on the standard computer keyboard are not present in legend 94. In particular, commands of keypad 28, Caps Lock, Num Lock, and functions. Commands of keypad 28 are hardly ever used and can consequently be omitted. Caps Lock is redundant, because the Shift chord can effortlessly be held down as an alternative to Caps Lock Mode. Not having a Caps Lock Mode is also less error-prone. Num Lock is redundant for obvious reasons.

Instead of functions, combinations of a modifier and a non-modifier can be used. On the standard computer keyboard, functions have an important advantage over combinations of a modifier and a non-modifier. Namely, functions are easy to press and combinations of a modifier and a non-modifier are difficult to press. On keyboard 66, however, combinations of a modifier and a non-modifier are easy to enter.

With today's 'pull-down menu' graphical user interfaces, functions are used almost exclusively as shortcuts to select menus and menu items. For example, in Microsoft Word, F1 is a shortcut to select the first menu item of the Help menu, which can also be selected with the mouse, or by Alt+H followed by H. So the mouse, modified symbols, and symbols can be used as alternatives to select the menus and menu items selected by the functions. Non pull-down menu graphical user interfaces usually also have alternatives to functions. For example, functions are often used to select items on screen, as an alternative the item can usually be selected by inputting Tab repeatedly to have a cursor move to the item on the screen and inputting Enter to select the item.

Placement of Keys and Digits—FIG. 3

Keys 74, 76, 78, 80, 82, 84, 86, 88, 90, and 92 are similar in shape to Enter key 140 of a standard computer keyboard and accommodate all potential human operators, i.e. of all hand sizes from age five upwards. Each key is elongated with one end of the key accommodating big hands and the other end accommodating small hands. The placement of the keys is determined on the basis of anthropometric data of U.S. children from "Anthrokids", a study by the Consumer Product Safety Commission (CPSC) published on the Internet (http://ovrt.nist.gov/projects/anthrokids/) by the National Institute of Standards and Technology (NIST). The placement of five light-colored keys 74, 76, 78, 80, and 82 is an exact mirror image of the position of five dark color keys 84, 86, 88, 90, and 92. Consequently only the placement of one of the two groups of five keys needs to be discussed. Dark colored keys 84, 86, 88, 90, and 92 will be discussed.

Figure 6:
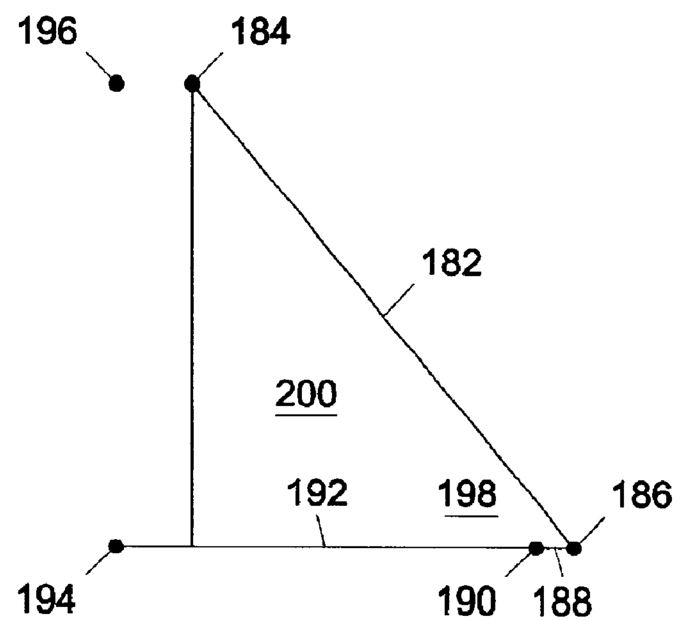
FIG. 6 shows a schematic top view of an operator operating the keyboard of the preferred embodiment of the invention.

FIG. 6—Calculation of Key Placement

The inward rotation of blue key 88 is based on the angle which an operator's right underarm makes with keyboard 66 when operating the keyboard. The angle which an operator's right underarm makes with keyboard 66 is equal to the angle which the operator's underarm makes with the chest of the operator when viewing the operator operating keyboard 66 from above. FIG. 6 shows a schematic representation of a top view of the right half of the body of an operator operating keyboard 66. The right middle finger of the operator is placed approximately on the center of blue key 88, so that a finger tip 184 of the middle finger is positioned 1 cm from the center of blue key 88. Finger tip 184 is connected by underarm 182 to an elbow tip 186. Elbow tip 186 is connected by an upper arm 188 to a shoulder tip 190. (Since FIG. 6 shows a top view, upper arm 188 is very short.) Shoulder tip 190 is connected by a chest half 192 to a body center 194 of the operator. Straight in front of body center 194 is a middle 196 of keyboard 66. An angle 198, which underarm 182 makes with chest half 192 is calculated from the lengths of the sides of a right-angled triangle 200 of which underarm 182 is the hypotenuse. The lengths of the hypotenuse and the short side of triangle 200 are used to calculate the size of angle 198. The short side consists of upper arm 188 and chest half 192. The length of the short side is calculated by adding the length of chest half 192 and the length of upper arm 188, and subtracting from this sum the distance between middle 196 and finger tip 184. The length of chest half 192, which is equal to half the shoulder breadth, and the length of underarm 182, which is equal to the elbow-hand length, are taken from the anthropometric data shown in Table 6. The length of upper arm 188 is estimated to be 2–3 cm. The distance between middle 196 and finger tip 184, keyboard-finger in Table 6, is set to 3.5–4.5 cm. Table 6 shows the relevant anthropometric data and the angles for different ages.

TABLE 6

Data relating to the angle between the arm of the operator and the keyboard

| Age in years | 4.5–5.5 (cm) | 17.5–19.0 (cm) |
|---|---|---|
| shoulder breadth | 26.8 | 43.2 |
| elbow-hand | 28.5 | 45.9 |
| upper arm | 2 | 3 |
| keyboard-finger | 4.5 | 3.5 |
| angle (degrees) | 67.5 | 62.6 |

The angle at which blue key 88, operated by the middle finger, is placed on keyboard 66, is 63 degrees. This is slightly more than the calculated 62.5 degrees of angle 198 for age group 17.5–19.0, i.e. adults.

The preferred placement of the fingers is determined relative to the placement of tip of middle finger 184. The distances between the tip of the fingers are measured in two directions, the breadth and the length of the hand. The distances are shown in Tables 7 and 8. The distances are based on the actual measurement of distances of a person operating the keyboard with a hand size corresponding to the mean hand measurements of the age group 17.5–19.0 of the anthropometric data. The distances in Tables 7 and 8 for the age group 4.5–5.5 are derived by downscaling from the age group 17.5–19.0. Comparing hand breadth, finger length, etc. of the anthropometric data gives a scaling factor of 0.67 for breadth shown in Table 7 and a scaling factor of 0.63 for length shown in Table 8.

TABLE 7

Distance from the middle finger to the other finger measured in the direction of the breadth of the hand

| Age in years | 4.5–5.5 (cm) | 17.5–19.0 (cm) |
|---|---|---|
| index finger | 1.4 | 2.1 |
| ring finger | 1.4 | 2.1 |
| little finger | 2.8 | 4.2 |

TABLE 8

Distance from the middle finger to the other fingers measured in the direction of the length of the hand

| Age in years | 4.5–5.5 (cm) | 17.5–19.0 (cm) |
|---|---|---|
| index finger | 0.4 | 0.6 |
| ring finger | 0.3 | 0.4 |
| little finger | 1.7 | 2.7 |

The placement of the tip of the thumb is measured via the crotch of the thumb, where the angle between the thumb and the middle finger is estimated at 25 degrees. The relevant distances in Table 9 are from the anthropometric data.

TABLE 9

Distances from the middle finger to the thumb via the crotch of the thumb

| Age in years | 4.5–5.5 (cm) | 17.5–19.0 (cm) |
|---|---|---|
| crotch length | 8.2 | 13.0 |
| crotch breadth | 2.2 | 3.3 |
| thumb length | 4.1 | 6.6 |

It is impossible to place keys 74, 76, 78, 80, 82, 84, 86, 88, 90, and 92, shaped like Enter key 140 of the standard computer keyboard, on keyboard 66 such that all potential operators can comfortably place their digits on the keys in the preferred digit position. One end of the keys is placed on keyboard 66 such that adults can place their digits in the preferred digit position. The other end accommodates children of age five, requiring them to spread their digits more than they would in the preferred digit position. All intermediate ages are accommodated by positioning their digits appropriately between both ends of the keys. The preferred digit position for adults is one centimeter from the center of each key. In the opposite direction, also at one centimeter from the center of each key, children of age five are accommodated. The differences in distance between the actual and the preferred digit position for children of age five are shown in Table 10.

TABLE 10

| | Differences in distance between actual and preferred digit position for children of age five | |
|---|---|---|
| | breadth (cm) | length (cm) |
| index finger | 0.55 | 0 |
| ring finger | 0.55 | 0 |
| little finger | 0.5 | 0.2 |
| thumb | 0.15 | 0 |

Electronics of Keyboard 66

The electronic circuitry (not shown) of keyboard 66 relays key events of keys 74, 76, 78, 80, 82, 84, 86, 88, 90, and 92. The electronic circuitry relaying key events is electronically almost identical to that found in standard computer keyboards. The only difference is the smaller number of key switches of keyboard 66. Instead of 101 key switches, keyboard 66 has only ten key switches, corresponding to keys 74, 76, 78, 80, 82, 84, 86, 88, 90, and 92. Thus keyboard 66 is electronically identical to a standard computer keyboard of which all but ten keys are removed.

Not all subsets of ten keys of all standard computer keyboards are suitable to function as keys 74, 76, 78, 80, 82, 84, 86, 88, 90, and 92 of keyboard 66, however.

Figure 7:
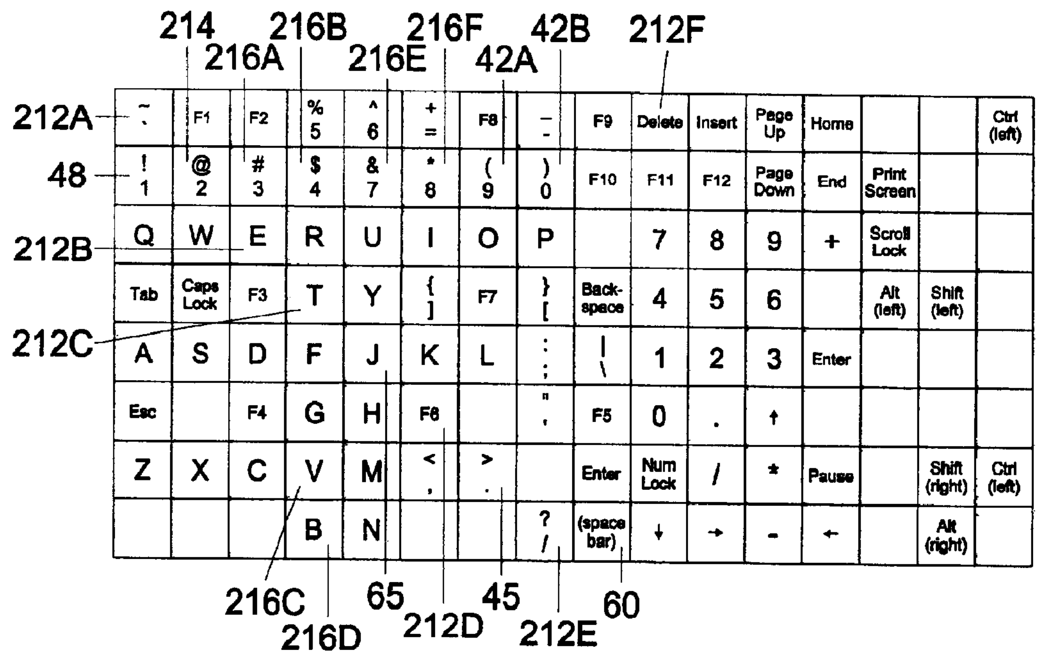
FIG. 7 (prior art) shows the keys of the standard computer keyboard arranged in a key matrix of eight rows and sixteen columns.

FIG. 7—Detection of Key Events by Standard Computer Keyboard

Which subsets of ten keys of standard computer keyboards are suitable to function as keys 74, 76, 78, 80, 82, 84, 86, 88, 90, and 92 of keyboard 66 depends on the wiring of standard computer keyboards. FIG. 7 shows the keys of the standard computer keyboard arranged in a key matrix of eight rows and sixteen columns. The keys of the standard computer keyboard are typically wired in such a key matrix of eight rows and around sixteen columns. Nearly all standard computer keyboards are designed around a variety of 8-bit microcontrollers. The eight rows are input lines to the microcontroller and the sixteen columns are output lines of the microcontroller.

If a key is pressed, an input line is connected to an output line. Each of the input lines are pulled high (by the positive side of a voltage source) if they are not connected to an output line, which is pulled low (by the negative side of a voltage source). Key events are detected by scanning the key matrix. Sequentially each of the sixteen matrix output lines are pulled low, while all the other output lines are high. The eight matrix input lines are read and the eight-bit input value is compared with the result of the previous scanning of the same matrix output line. If a bit differs, a key event corresponding to that bit occurred since the previous scanning.

In order to function properly, keyboard 66 must be able to detect and relay every key event (key press as well as key release) in any possible sequence of key events. Not all subsets of ten keys of all standard computer keyboards are able to detect every key event. Every standard computer keyboard has subsets of ten keys able to detect every key event, however.

Figure 8:
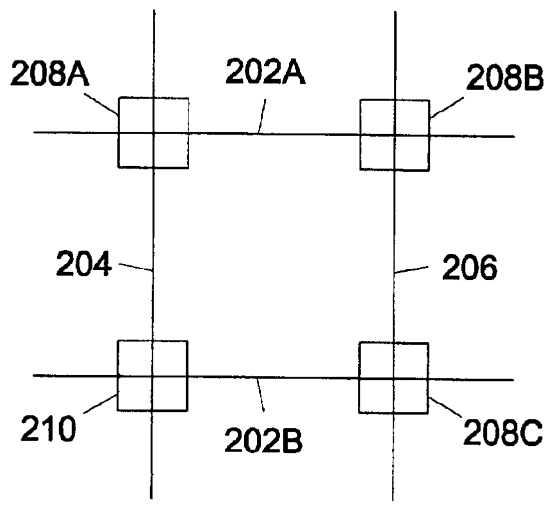
FIG. 8 (prior art) shows a schematic bottom view of part of the key matrix illustrated in FIG. 7.

FIG. 8—Limitations of Key Event Detection by Standard Computer Keyboards

Standard computer keyboards using a key matrix have several limitations to detect key events. FIG. 8 illustrates a fundamental limitation of keyboards using a key matrix to detect key events. FIG. 8 shows a schematic bottom view of part of the key matrix, comprising a rectangle formed by matrix input lines 202A and 202B and matrix output lines 204 and 206. If three keys 208A to 208C from three corners of the rectangle are held down, a key 210 on the fourth corner of the rectangle, although not pressed, will also be detected as pressed. Because all keys 208A to 208C and 210 are connected through lines 202A, 202B, and 206, all will be pulled low if key 210 is scanned.

Many existing standard computer keyboards are not capable of detecting all key events, if more than two of ten keys used for chording are in the same row of the key matrix, i.e. on the same input line. These keyboards do not support hardware key rollover. For economic reasons these keyboards have no decoupling diodes in the key matrix. The decoupling diodes prevent output lines interfering with each other. If two or more keys on the same input line are held down, the output lines of these keys are connected through these keys and their input line. An output line scanning one of these keys may not be able to pull the other output lines, which are high, down. As a consequence some key events, in some sequences of key events, are not detected.

Most keyboards do support two-key rollover. Two-key rollover occurs if an operator presses a key before releasing the previous pressed key. Two-key rollover means that if two keys are pressed in sequence and held down, key press events of these keys are relayed in that sequence.

Since there are only eight input lines to be shared among ten keys 74, 76, 78, 80, 82, 84, 86, 88, 90, and 92 of keyboard 66, some of the keys have to be on the same input line. Two-key rollover, which is supported by most if not all standard computer keyboards, allows two keys to be on one input line. For example, keys 74, 76, 78, 80, 82, 84, 86, 88, 90, and 92 are connected like standard computer keyboard keys 212A, 214, 212B, 212C, 65, 212D, 45, 212E, 60, and 212F in the key matrix. Note that no more than two keys are in the same row of the key matrix. So that key event detection problems, which can be caused by keys sharing input lines, are prevented.

Description of Input System Software 68—FIG. 2

Input to input system software 68 (FIG. 2) are the key event signals of keys 74, 76, 78, 80, 82, 84, 86, 88, 90, and 92 relayed by keyboard 66. The chord software outputs key event signals corresponding to chords entered by the operator, as if the key event signals were the result of key events. Key event signals of keys 74, 76, 78, 80, 82, 84, 86, 88, 90, and 92 corresponding to chords of representation 94 are processed by the chord software to key event signals corresponding to inputs assigned the chords. Key event signals corresponding to pressing the Redo chord and holding it down are processed by the chord software to auto-repeat the previous input symbol, as described.

Implementation of Input System Software 68

Source code and Table 11, both appended, implement input system software 68 with the exception of auto-repeat. Auto-repeat is not included to keep the source code clear and simple. Adding software implementing auto-repeat is straightforward for one having skill in the art. The source code is implemented as part of the X Window System of the X Consortium, part of the Red Hat 6.0 distribution of the Linux operating system for a PC with an x86 processor. The source code is produced by modifying one file, named "NextEvent.c" located in the "xc/lib/X11/" directory of the X Window System build tree. The modified source code is written in the C programming language. None of the original source code in "NextEvent.c" is deleted. By replacing the original version of file "NextEvent.c" by the modified version of file "NextEvent.c" before a build of the X Window System, a system implementing the chord software can be implemented.

Table 11 in the attached Appendix shows the contents of file "/table" located in the root directory of the operating system. File "/table" is read by the source code to partially initialize the internal chord table of the source code. Note that Table 11 does not include combinations of a modifier chord and a character chord since these combinations are added to the internal chord table by the source code.

In Table 11, blank lines and lines starting with a semicolon are ignored by the source code. Lines starting with a semicolon are included to assist a human reader. Other lines of the table each assign one chord to one symbol. The table has three columns. The left column represents the light colored keys 74, 76, 78, 80, and 82 involved. The middle column represents the dark colored keys 84, 86, 88, 90, and 92 involved. The right column represents the symbol. Adjacent columns are separated by a single tab. Keys are represented by a single letter representing the digit operating the key. The thumb is represented by the letter "t", the index finger by "i", the middle finger by "m", the ring finger by "r", and the little finger by "l". Symbols are represented by a string form of the symbol, as described in the "Xlib Programming Manual" (by A. Nye, 3rd Edition (O'Reilly & Associates, 1992) p. 300).

The string form of a symbol can be prefixed by a dollar sign representing the Shift modifier, an ampersand representing the Ctrl modifier, an asterisk representing the Alt modifier, or a combination of these three symbols representing the modifiers. For example, the string form "colon" of the symbol : is prefixed with a dollar sign representing the Shift modifier. Half of the key-sharing characters are input on the standard computer keyboard by pressing a key in combination with the Shift modifier. The string forms of these key-sharing characters are prefixed with a dollar sign because the X Window System requires these key-sharing characters to be combined with the Shift modifier.

Description of First Alternative Embodiment

In a first alternative embodiment (not illustrated) representing a second presently preferred embodiment of the invention, instead of relaying key event signals corresponding to key events of keys 74, 76, 78, 80, 82, 84, 86, 88, 90, and 92, keyboard 66 relays key event signals corresponding to chords entered by the operator to main unit 70. Key event signals of keys 74, 76, 78, 80, 82, 84, 86, 88, 90, and 92 are processed by a microcontroller in keyboard 66 to key event signals corresponding to chords entered by the operator. Chord processing by keyboard 66 has the advantage that no input system software has to be installed on main unit 70. Consequently, keyboard 66 can be used instead of a standard computer keyboard with any device, which can receive input from a standard computer keyboard. There is no need to install input system software. Consequently there is no need for adapting input system software to particular systems and devices.

In the first alternative embodiment, keyboard 66 uses a USB (universal serial bus). USB devices have the advantage that they can be used immediately after being plugged in. Consequently, a user can use keyboard 66 as a mobile keyboard, which can effortlessly be used with several devices.

In the first alternative embodiment, input system software 68 is implemented as part of the firmware in the keyboard microcontroller. USB standard computer keyboards containing a single keyboard microcontroller with PROM (programmed read-only memory) already exist. The firmware of the keyboard microcontroller in an existing USB standard computer keyboard can be split in two parts: "detecting firmware" detecting key events and "USB firmware" coding key events in the USB protocol. In the first alternative embodiment of keyboard 66, key events can be detected by the detecting firmware of an existing USB standard computer keyboard. Then processed by input system firmware. And finally coded in the USB protocol by the USB firmware of an existing USB standard computer keyboard. Implementation of the input system firmware is straightforward for one having skill in the art. The input system firmware is functional identical to input system software 68 of the preferred embodiment.

Description of Second Alternative Embodiment

In a second alternative embodiment (not illustrated) keyboard 66 is foldable for easier transportation. In the second alternative embodiment keyboard 66 has a hinge in the middle, dividing keyboard 66 in a left half and a right half.

The left half and the right half of legend 94 are not connected by a hinge, they are simply pushed in before the keyboard is folded. For transportation the left half folds on top of the right half. When folded keyboard 66 is only about 10 cm wide, 12.5 cm deep, and 2 cm thick. For comparison, the mechanically complex collapsible keyboard (U.S. Pat. No. 6,174,097 to S. R. Daniel, 2001), is about the same size, namely 8 cm wide, 15 cm deep, and 2 cm thick, when collapsed.

Description of Third Alternative Embodiment

Instead of keyboard 66, a standard computer keyboard such as shown in FIG. 1 can be used as a keyboard of the present system. Ten keys 48, 214, 216A to 216F, 42A and 42B can be used by most full grown hands instead of colored keys 74, 76, 78, 80, 82, 84, 86, 88, 90, and 92 of keyboard 66 of FIG. 3. FIG. 7 shows that of keys 48, 214, 216A to 216F, 42A and 42B, not more than three keys are on corners of the same rectangle in the key matrix. Thus, as explained above, standard computer keyboards with decoupling diodes in the key matrix can detect every key event of keys 48, 214, 216A to 216F, 42A and 42B. Such standard computer keyboards can function as a fully functional keyboard of the input system. Standard computer keyboards with no decoupling diodes in the key matrix may not detect all key events of keys 48, 214, 216A to 216F, 42A and 42B. Most frequently used chords will, however, be detected correctly even by standard computer keyboards with no decoupling diodes. Frequently used chords involve few keys and will be detected correctly by standard computer keyboards that support two-key rollover.

Other selections of ten keys are possible. The only restriction is that none of the ten keys are on four corners of the same rectangle in the key matrix. To accommodate various hand sizes, several keys can be made to function identically, so that both big and small hands can easily operate a suitable collection of ten keys.

Conclusion, Ramifications, and Scope of Invention

Thus the reader will see that the chord system of the invention provides a compact, intuitive, self-explanatory, easy-to-use, easy-to-learn, efficient, accurate, and powerful input system for character input, command input, and modified character input, which is economical and can be used by persons of almost any age.

That the system prevents typing errors, by requiring no finger movements between keys. That it is easy-to-use for first-time users. That it can be used relatively efficiently by memorizing the easy-to-learn positions of orderly arranged letters. And that it is easy-to-learn to operate efficiently and users gradually learn to operate it really efficiently.

That the system is ergonomically designed, by assigning easier entered chords to more frequently used symbols and giving the stronger fingers a higher workload. That it prevents accidental input of commands and modified characters during character input to result in problematic and potentially confusing input. And that it includes a permanently-visible, intuitive, self-explanatory, compact, logically-structured presentation of the fixed assignment of chords to the symbols found on the standard computer keyboard.

That the system is compact, flat, and easy to carry, and can be embodied in a single mobile input device which can be used for input to several devices normally used with different standard computer keyboards, overcoming network externalities. That it is compatible with the standard computer keyboard, overcoming hardware and software lock-in. And that it is inexpensive to manufacture, since it uses the same electronic hardware as the standard computer keyboard.

While my above description contains many specificities, these should not be construed as limitations on the scope of the invention, but rather as an exemplification of one preferred embodiment thereof. Many other variations are possible. For example, Keyboard 66 can be replaced by another device with ten digit-operated keys. For example, a handheld device resembling a television remote control, a game pad, or a mobile phone. Such a handheld device can have two keys for the thumbs on the front side and the other eight finger keys on the backside of the device. To operate such a handheld device the operator grips the device with both hands. Each hand wrapped around one side of the device similar to holding a steering wheel, each key positioned at a fingertip. With such a handheld device the hands of the operator are in a different position, the palms of the hand, instead of the back of the hands, face the operator. Legend 94 can be adapted accordingly, as described in the following paragraph. With such a handheld device legend 94 can be shown on main unit 70 or shown on the device.

In case the operator operates finger keys 74, 76, 78, 80, 86, 88, 90, and 92 with the palm of the hands towards the body or the head, legend 94 can be adapted accordingly. In this case, in alphabet section 96 the order of the colored-areas in groups 142 and rows 144 and 146 should be reversed, and the corresponding letters of the top half and bottom half of array 100 should be exchanged. This exchange has the advantage that the letters in array 100 are as a result ordered from top to bottom in decreasing frequency of use, so the operator can search more efficiently from top to bottom for a letter in alphabet section 96. In non-alphabet section 98, columns 118, 120, 122, and 124 should be reversed, and columns 126, 128, 130, and 132 should be reversed. To retain the original assignment of chords to symbols the order of the letters in groups 142 and rows 144 and 146 can be reversed, and the right half and the left half of array 100 can be exchanged. A disadvantage of retaining the original assignment is that the alphabetical orders in array 100 and groups 102 are reversed.

Keyboard 66 can be replaced by any device capable of detecting the transitions between two states of each of the operator's digits. For instance, gloves which can detect the bending and stretching of digits, such as the Dataglove manual input device by VPL Research (Scientific American, October 1987, p. 86), or a simplified version of such a device. Or as another example, a touch-sensitive unit can be attached to each of the fingertips. In this case, the transitions between touching a surface or not touching a surface with a fingertip can be detected. As yet another example, a touch sensitive touchpad which the fingertips touch or not touch, such as a touchpad with a multi-touch surface (Method and apparatus for integrating manual input (U.S. Pat. No. 6,323,846 to W. Westerman and J. Elias, 2001)) by Fingerworks (http://www.fingerworks.com/). As a further example, a pressure sensitive touchpad on which the finger tips rest or press. In these cases legend 94 can be shown on main unit 70.

Input system software 68 can be replaced by other means to process the input data. For example, input system software 68 can be replaced by hardware or programmable hardware.

Main unit 70 can be replaced by any device requiring symbol input. For instance, main unit 70 can be replaced by an adapted television, a calculator, a game computer, or a computer other than a PC.

Keyboard 66 can be connected to main unit 70 in another way than by keyboard cable 72. The only requirement is that state change information of keys 74, 76, 78, 80, 82, 84, 86, 88, 90, and 92 is relayed somehow to main unit 70. For example, keyboard 66 can be connected without wires to main unit 70.

Keyboard 66 can also be made part of main unit 70, for example in a laptop computer.

The casing of keyboard 66 can have a different color.

Keyboard 66 can have different dimensions.

The whole input system can be integrated to a single handheld device involving a video display with ten keys near the edges operated by hands gripping the device, as described above. In this case legend 94 can be shown on part of the video display or next to it on the device.

Colored keys 74, 76, 78, 80, 82, 84, 86, 88, 90, and 92 can be replaced by keys whose color is not significant. The operator can easily determine the color representing each key by looking at legend 94. The operator can determine the color representing each finger key from colored areas 142 and colored letter rows 144 and the key representations shared by all chord representations in each of columns 118, 120, 122, 124, 126, 128, 130, and 132. The operator can determine the color representing each thumb key from the chord representations of numeral group 116.

Legend 94 can be attached differently to keyboard 66 or it can be shown on another surface, for example on main unit 70.

The colors of keys 74, 76, 78, 80, 82, 84, 86, 88, 90, and 92 and the corresponding colors of key representations in chord representations of legend 94 can be any other ten colors such that chord representations are clearly recognizable.

The ten colors of keys 74, 76, 78, 80, 82, 84, 86, 88, 90, and 92 and corresponding colors in legend 94 can be replaced by ten other easily distinguishable indicia. For example, ten non-color symbols can be used, such as a triangle, a circle, a square, etc. Or as an other example, ten indicia for blind operators, e.g., Braille-like dots or different tactile ridges, can be used. Of course in the latter example both legend 94 and main unit 70 have to be adapted to blind operators. Legend 94 can be translated to Braille. The video display of main unit 70 can be replaced by a Braille display. For example, the (small) NIST (National Institute of Standards and Technology) Rotating-Wheel Based Refreshable Braille Display (Refreshable braille reader (U.S. Pat. No. 6,776,619 to J. W. Roberts. O. T. Slaitery, and D. W. Kardos, 200). http://www.itl.nist.gov/div895/isis/projects/brailleprojcct.html) by the NIST can be put between keys 80, 86, 82, and 84.

Keys 74, 76, 78, 80, 82, 84, 86, 88, 90, and 92 can have a different shape. For example, they can be shaped like the majority of keys on the standard computer keyboard. Or finger keys 74, 76, 78, 80, 86, 88, 90, and 92 can be tapering to better accommodate small hands.

Keyboard 66 can have fewer or more than ten keys. Fewer keys can be used if fewer colors are used. For example, keys 74 and 92 corresponding to the little fingers, and colors pink and brown can be omitted. If fewer colors are used, the number of possible chords is also smaller. Fewer keys can also be used if keys represent more than one color. Keys can represent more than one color, if the color they represent depends on the state of the system. For example, a one-handed person can use the system with five keys corresponding to a single hand. To enter a chord the operator sequentially enters the left and the right hand part of the chord. For chords, which involve only left or right hand keys, a special chord can be made to function as if no keys are pressed by the left or right hand. For example, the one-handed chord involving index, middle, and ring finger.

More keys can be used, if more colors are used. For example, the thumbs can each operate two different colored keys. If more colors are used, the number of possible chords is also greater. More keys can also be used, if more than one key has the same color. In this case, keys with the same color function identically. For example, keyboard 66 can have ten keys for an operator with big hands and ten other keys for an operator with small hands.

Legend 94 can have different dimensions and/or a different background color.

Particular types of symbols can be assigned different specific (matching) types of chords. For example, symbols of command groups 112 can be assigned chords of movement groups 114 and vice versa.

Symbols of command group 112L can be assigned chords of movement group 114L and vice versa. The chords should be assigned so that all symbols of command group 112 involve the left thumb and all symbols of movement group 114 involve the right thumb. In this case inputting a sequence of symbols of both command groups 112L and 112R or both movement groups 114L and 114R is easier, since the operator can hold down the thumb key involved. For example, a sequence of arrows can be input by holding down black key 84 and pressing and releasing a sequence of single keys 78, 80, 86, and 88. Thus inputting arrows resembles the use of arrow keypad 22 of the standard computer keyboard (FIG. 1). That is, while black key 84 is held down, inputting each arrow corresponds to pressing and releasing a single key.

The letters in alphabet section 96 can be arranged differently. For example, they can be arranged alphabetically from top to bottom and left to right. In this case looking up letters is easier, but inputing text is less ergonomic, since the easiest chords are not assigned to the most frequently occurring letters.

Non-alphabet group 98 can have more groups. For example, directly below bracket groups can be a left group and a right group which map eight characters to chords involving one finger of one hand, and an index and a ring finger of the other hand. As another example, directly below movement groups 114 can be a left group and a right group which map eight commands to chords involving both thumbs and one finger.

Groups 106 and 116 can be shown above alphabet section 96 instead of below it. Groups 108, 110, 112, and 114 can also be arranged in a different order. Within group 108 rows 134, 136, and 138 can be arranged in a different order.

The symbols within groups 106, 108, 110, 112, 114, and 116 can be arranged differently.

Colored-area groups 142 can be adapted to more clearly represent fingers. For example, the outline of the nails of the fingers and the outline of the fingers themselves could be added.

In addition to colored-area groups 142, a white and a black colored-area, representing respectively the left thumb and the right thumb, can be added to more clearly show that diagonal rows of array 100 represent the fingers of the hands. For example, the black colored-area can be shown horizontally extending to the left from the lower left of array 100 (bordering the letter E) and the white colored-area can be shown similarly on the right side of array 100. To make room for the black and white colored-areas, rows 144 can be omitted, as described below, and rows 146 can be moved towards array 100, so that they become adjacent to array 100.

Colored-area groups 142 can be replaced by other indicia clearly representing fingers. For example, by finger shapes with no significant color, such as outlines of finger shapes.

Colored letter rows 144 can be omitted. In this case, the letters in left colored letter row 144L and right colored letter row 144R can be shown in a similar fashion in respectively left colored-area group 142L and right colored-area group 142R. (To retain the original assignment of chords to symbols, the letters in left colored letter row 144L and right colored letter row 144R can be shown in a similar fashion in respectively right colored-area group 142R and left colored-area group 142L.) In this case, the little finger representations of colored-area groups 142 can be made somewhat longer, so that each letter clearly has two background colors.

The dark-gray background color of middle column 104 can be another suitable color or can be omitted.

Colored letter rows 146 can be shown separately in a different position. For example, they can be shown horizontally.

Within chord representations, for example chord representations 148 and 154, the colored rectangles representing a chord can be ordered differently and key representations can be shown differently adjacent or nonadjacent. For example, the key representations shared by all chord representations in each of columns 118, 120, 122, 124, 126, 128, 130, and 132 can be shown as the first key representation in chord representations in which all key representations are adjacent.

Key representations, for example representation 152, can be replaced by other key representations or digit representations. For example, they can be replaced by digit representations which are round at the top, resembling the color areas representing fingers in colored area groups 142. Or as another example, colored circles can be used. As yet another example, digit shapes, a different shape for each digit, such as the shapes of the color areas in groups 142, with no significant color, can be used to represent digits.

Within each symbol-chord pair, for example symbol-chord pair 150, the chord representation does not have to follow the symbol directly to the right. For example, the chord representation can be directly below the symbol. Or as another example, in the right half of legend 94 chord representations can be to the left of the symbol, instead of the right. This would make legend 94 more symmetric, the mirror symmetry of left-half and right-half chord representations would be more clearly visible.

Modifier symbols can be shown differently in symbol-chord pairs. For example, each modifier can be shown in a separate symbol-chord pair. Or a modifier and another symbol assigned the same chord can both precede the chord representation. For example, the symbols 5 and Ctrl separated by a slash can precede chord representation 152.

Instead of the Redo chord, auto-repeat can be assigned another chord. For example, the chord involving both thumbs, both index fingers, and both middle fingers can be assigned to auto-repeat. A symbol-chord pair representing the assignment can, for example, be shown just below legend 94 on keyboard 66. Pressing the chord and holding it down will auto-repeat the previous input. In this case, the initial short time delay before auto-repeat normally starts can be omitted, making auto-repeat more efficient.

Instead of a chord being entered by pressing and releasing the keys it comprises, a chord can be entered by determining the invocation of the keys in another way. For example, a chord can be entered by pressing the keys simultaneously or within a short time interval without the need to release the keys. In this case, entering chords closely resembles pressing keys on the standard computer keyboard, in both cases an input is generated in response to pressing keys.

Functions can be added to the input system to provide compatibility with software that offers no alternative to inputting functions. For example, a group of functions can be added to legend 94. As another example, functions can be assigned combinations of a modifier and a non-modifier not available on the standard computer keyboard, for example F1 is Shift+~, F2 is Shift+!, F3 is Shift+@, etc. In this case, the assignment of functions can, for example, be shown on the back of keyboard 66.

The electronic circuitry of keyboard 66 relaying key events can be replaced by simpler electronic hardware able to detect and relay every key event.

Keys 74, 76, 78, 80, 82, 84, 86, 88, 90, and 92 can be connected differently than ten standard computer keyboard keys 212A, 214, 212B, 212C, 65, 212D, 45, 212E, 60, and 212F in the key matrix.

The source code reads a file containing a table to initialize an internal chord table, which can be integrated in the source code or further divided in parts.

The source code is implemented in the C programming language, because the X Windows System is written in the C programming language. The source code can, however, in principle be written in any general-purpose programming language, a suitable specialized programming language, or in machine language.

Input system software 68 is implemented as part of a graphical user interface, but the chord software can be implemented on virtually any software level. For example as part of the keyboard device driver, the operating system, or applications.

Input system software 68 can be implemented as firmware or hardware. For example as part of keyboard 66 (as in the first alternative embodiment) or as part of main unit 70.

Accordingly, the scope of the invention should be determined not by the embodiments illustrated, but by the appended claims and their legal equivalents.

Appendix to Patent Application of Herman Ehrenburg for the Visualizable-Presented, Computer-Compatible, Color-Coded Manual Input System

TABLE 11

```
/table lines 1 to 24

; Copyright (c) 2002
; Herman Ehrenburg
; _______
; left          |right          |symbol
; alphabet section
i               i               e
m               m               a
r               r               o
l               l               i
m               i               n
r               i               h
r               m               l
l               i               d
l               m               c
l               r               m
i               m               t
i               r               s
m               r               r
i               l               u
m               l               p
r               l               w
mi                              g
rm                              f

/table lines 25 to 48

lr                              b
ri                              k
li                              j
                im              v
                mr              x
                rl              y
                ir              q
                il              z
; modifier group
t               t               space
; sign groups
l               im              minus
r               im              $asciicircum
m               im              grave
i               im              comma
mi              i               period
mi              m               apostrophe
mi              r               $quotedbl
mi              l               $plus
l               mr              equal
r               mr              $asciitilde
m               mr              backslash

/table lines 49 to 77

i               mr              semicolon
rm              i               $colon
rm              m               slash
rm              r               $asterisk
rm              l               $numbersign
l               rl              $underscore
r               rl              $at
m               rl              $ampersand
i               rl              $question
lr              i               $exclam
lr              m               $percent
lr              r               $dollar
lr              l               $bar
; bracket groups
l               il              $less
r               il              $braceleft
m               il              bracketleft
i               il              $parenleft
li              i               $parenright
li              m               bracketright
li              r               $braceright
li              l               $greater
```

TABLE 11-continued

```
; command groups
l       t       Undo
r       t       Escape
m       t       Tab
i       t       BackSpace
```

/table lines 78 to 106

```
t       i       Delete
t       m       Return
t       r       Insert
t       l       Redo
; movement groups
lt              Home
rt              Page_Up
mt              Up
it              Left
        ti      Right
        tm      Down
        tr      Page_Down
        tl      End
; numeral group
l               1
r               2
m               3
i               4
t               5
        t       6
        i       7
        m       8
        r       9
        l       0
; Ctrl-Alt-Delete
rmit    timr    &*Delete
```

SOURCE CODE WHICH IMPLEMENTS CHORD SOFTWARE

NextEvent.c lines 1 to 34

```
/* $XConsortium: NextEvent.c, v 11.19 94/04/17 20:20:19 kaleb Exp $ */
/*
Copyright (c) 1986 X Consortium
Permission is hereby granted, free of charge, to any person obtaining a
copy of this software and associated documentation files (the
"Software"), to deal in the Software without restriction, including
without limitation the rights to use, copy, modify, merge, publish,
distribute, sublicense, and/or sell copies of the Software, and to
permit persons to whom the Software is furnished to do so, subject to
the following conditions:
The above copyright notice and this permission notice shall be included
in all copies or substantial portions of the Software.
THE SOFTWARE IS PROVIDED "AS IS", WITHOUT WARRANTY
OF ANY KIND, EXPRESS OR IMPLIED, INCLUDING BUT NOT
LIMITED TO THE WARRANTIES OF MERCHANTABILITY, FIT-
NESS FOR A PARTICULAR PURPOSE AND NONINFRINGEMENT.
IN NO EVENT SHALL THE X CONSORTIUM BE LIABLE FOR ANY
CLAIM, DAMAGES OR OTHER LIABILITY, WHETHER IN AN
ACTION OF CONTRACT, TORT OR OTHERWISE, ARISING FROM,
OUT OF OR IN CONNECTION WITH THE SOFTWARE OR THE
USE OR OTHER DEALINGS IN THE SOFTWARE.
Except as contained in this notice, the name of the X Consortium shall
not be used in advertising or otherwise to promote the sale, use or
other dealings in this Software without prior written authorization from
the X Consortium.
Additions to the original version of the X Consortium are:
Copyright (c) 2002 Herman Ehrenburg
*/
#define NEED_EVENTS
#include "Xlibint.h"
```

NextEvent.c lines 35 to 69

```
#include <stdio.h>
#include <X11/keysym.h>
```

-continued

SOURCE CODE WHICH IMPLEMENTS CHORD SOFTWARE

```
enum { LL = 1, LR = 2, LM = 4, LI = 8, LT = 16, /* digit flags */
    RT = 32, RI = 64, RM = 128, RR = 256, RL = 512 };
/* Return next event in queue, or if none, flush output and wait for
 events. */
XNextEvent (dpy, event)
        register Display *dpy;
        register XEvent *event;
{
    XWindowAttributes windowattr;
    register _XQEvent *qelt;
    const int fingermask = LL | LR | LM | LI | RI | RM | RR | RL;
    /* multiple (10) flags */
    int tablechord; static int keystates, chord, digit;
    /* (internal) chord table */
    static KeySym keysyms[1024]; static unsigned int mask[1024];
    /* miscellaneous */
    static int initialize = 1; KeySym keysym;
    int i; FILE *file; char line[100]; char *c; char string[100];
    LockDisplay (dpy);
    if (dpy->head == NULL) _XReadEvents(dpy);
    qelt = dpy->head;
    *event = qelt->event;
    if (initialize) {
        initialize = 0; XAutoRepeatOff(dpy);
        XGetWindowAttributes(dpy, event->xany.window,
        &windowattr);
        XSelectInput(dpy, event->xany.window, KeyReleaseMask |
                KeyPressMask | windowattr.your_event_mask);
        /* empty the chord table */
```

NextEvent.c lines 70 to 104

```
        for (i = 0; i < 1024; i++) { keysyms[i] = 0; mask[i] = 0; }
        /* partially initialize chord table from the file "/table" */
        file = fopen ("/table", "r");
        while (fgets(line, 100, file) != NULL) {
            c = line; tablechord = 0;
            if (*c != ';' && *c != '\n') { /* comment or empty line? */
                while (*c != '\t') { /* left hand column */
                    switch (*c++) {
                    case 'l': tablechord |= LL; break;
                    case 'r': tablechord |= LR; break;
                    case 'm': tablechord |= LM; break;
                    case 'i': tablechord |= LI; break;
                    case 't': tablechord |= LT; break;
                    }
                }
                c++; while (*c != '\t') {/* right hand column */
                    switch (*c++) {
                    case 't': tablechord |= RT; break;
                    case 'i': tablechord |= RI; break;
                    case 'm': tablechord |= RM; break;
                    case 'r': tablechord |= RR; break;
                    case 'l': tablechord |= RL; break;
                    }
                }
                c++;        /* symbol column */
                while (*c == '$' || *c == '&' || *c == '*') {
                    switch (*c++) {
                    case '$': mask[tablechord] |= ShiftMask; break;
                    case '&': mask[tablechord] |= ControlMask; break;
                    case '*': mask[tablechord] |= ModlMask; break;
                    }
                }
                i = 0; while (*c != '\n') {string[i] = *c; i++; c++;}
                string[i] = '\0';
                keysyms[tablechord] = XStringToKeysym(string);
```

NextEvent.c lines 105 to 139

```
            }
        }
        fclose (file);
        /* add combinations of a modifier chord and a character chord */
        for (i = 1; i < 1024; i++) {
            if ((i & fingermask) == i) {
                keysym = keysyms[i];
```

-continued

SOURCE CODE WHICH IMPLEMENTS CHORD SOFTWARE

```
                if (keysym >= XK_a && keysym <= XK_z) {
                    keysyms[i | LT | RT] = keysym;
                    mask[i |LT | RT] = ShiftMask;
                }
                if ((keysym >= XK_exclam && keysym <=
                XK_slash) ||
                        (keysym >= XK_colon && keysym <=
                    XK_at) ||
                        (keysym >= XK_bracketleft && keysym <=
                    XK_asciitilde)) {
                    keysyms[i | LT] = keysym;
                    mask[i | LT] = mask[i] | ControlMask;
                    keysyms[i | RT] = keysym;
                    mask[i | RT] = mask[i] | Mod1Mask;
                }
            }
        }
    }
    if (event->type == FocusIn) {
        XGetWindowAttributes (dpy, event->xfocus.window,
        &windowattr);
        XSelectInput (dpy, event->xfocus.window, KeyReleaseMask |
                KeyPressMask | windowattr.your_event_mask);
        keystates = 0; chord = 0;
    }
    else if (event->type == KeyPress || event->type == KeyRelease) {
        XLookupString(event, string, 20, &keysym, 0);
        switch (keysym) {
        case XK_grave:          digit = LL; break;
        case XK_2:              digit = LR; break;
        case XK_e:              digit = LM; break;
        case XK_t:              digit = LI; break;
        case XK_Delete:         digit = LT; break;
        case XK_space:          digit = RT; break;
```

NextEvent.c lines 140 to 169

```
        case XK_j:              digit = RI; break;
        case XK_F6:             digit = RM; break;
        case XK_period:         digit = RR; break;
        case XK_slash:          digit = RL; break;
        default: exit(1);
        }
        if (event->type == KeyPress) {
            keystates |= digit; chord |= digit;
            event->type = KeyRelease;
        }
        else if (event->type == KeyRelease) {
            keystates &= ~digit;
            if (chord != 0 &&
                    (keystates == 0 ||
                      ((digit & fingermask) != 0 &&
                        (keystates & fingermask) == 0))) {
                if (keysyms[chord | keystates] != 0) {
                    event->xkey.type = KeyPress;
                    event->xkey.state = mask[chord | keystates];
                    event->xkey.keycode =
                        XKeysymToKeycode (dpy,
                    keysyms[chord | keystates]);
                }
                chord = 0;
            }
        }
    }
    _XDeq(dpy, NULL, qelt);
    UnlockDisplay(dpy);
    return 0;
}
```

I claim:

1. A method of enabling an operator to generate a plurality of inputs, comprising:

(a) providing a manual input means having a plurality of digit-operated switches by which a human operator can generate said plurality of inputs by entering chords, each of said switches operated by a specific digit of said operator, maid inputs comprising letters, said letters comprising the alphabet, (b) providing a plurality of modifiets, said modifiers being symbols other than said letters, said modifier, used in combination with non-modifier symbols to provide an input selected from the class consisting of a different case of the non-modifier symbol and a combination of the modifier and the non-modifier symbol, said non-modifier symbols including said letters, (c) assigning a first plurality of chords involving only fingers to said letters, said fingers being index, middle, ring, and little fingers of said operator, and (d) assigning at least one chord involving only thumbs of said operator to said respective modifiers, whereby (1) each chord composed of each chord assigned to said letters and each chord assigned to said modifiers can be assigned to a modified letter, (2) said modified letters can be readily input by said operator by entering a chord said operator composes of one chord assigned to maid letters and one chord assigned to said modifiers, (3) said combination can be a known combination of the modifier and the letter commonly used as input to known computer programs, (4) accidental input of said modified letters during input of said letters is prevented, and (5) maid chords involving only thumbs can be easily memorized by said operator as a specific type of chord assigned to said modifiers.

2. The method of claim 1 wherein said chords of said first plurality of chords assigned to said letters correspond to two of said fingers of said operator, whereby said letters can readily be input, and whereby said chords involving two fingers can be easily memorized by said operator as a specific type of chord assigned to said letters.

3. The method of claim 2 wherein those of said letters which occur more frequently in American English are assigned chords which are easier to enter, whereby American English is easier to input.

4. The method of claim 2 wherein frequently occurring vowels are assigned said chords assigned to said letters corresponding to corresponding fingers of the left hand and the right hand of said operator, whereby said chords corresponding to corresponding fingers of the left hand and the right hand can be easily memorized by said operator as a specific type of chord assigned to frequently occurring vowels.

5. The method of claim 1 wherein a second plurality of chords involving only fingers is assigned to respective characters other than letters, whereby each chord composed of each chord assigned to said characters and each chord assigned to said modifiers can be assigned to a modified character, said modified character being a combination of the modifier and the character, and whereby said modified characters can be readily input by said operator by entering a chord said operator composes of one chord assigned to said characters and one chord assigned to said modifiers.

6. The method of claim 5 wherein said second plurality of chords involving three of said fingers of said operator are assigned to punctuation marks and miscellaneous characters and brackets for operating a computer, whereby said punctuation marks and said miscellaneous characters and said brackets can readily be input, and whereby said first plurality of chords involving three of said fingers can be easily memorized by said operator as a specific type of chord assigned to said punctuation marks and said miscellaneous characters and said brackets.

7. The method of claim 1 wherein a second plurality of chords involving one of said fingers and one of said thumbs of said operator is assigned to commands for operating a computer, whereby said commands can readily be input, whereby said chords involving one of said fingers and one of said thumbs can be easily memorized by said operator as a specific type of chord assigned to said commands, and whereby accidental input of said commands during input of said letters is prevented.

8. The method of claim 1 wherein a second plurality of chords involving one of said digits of said operator is assigned to numerals, whereby said numerals can readily be input, and whereby said chords involving one of said digits can be easily memorized by said operator as a specific type of chord assigned to said numerals.

9. The method of claim 8 wherein said numerals correspond in their natural order to said digits of said operator, whereby chords assigned to said numerals can be easily memorized.

10. The method of claim 1 wherein a plurality of first pairs of said inputs are assigned a plurality of second pairs of chords, said plurality of first pairs being pairwise related inputs, said plurality of second pairs being each other's minor image by pairwise exchanging switches assigned to coirespouding digits of the left hand and the right hand of said operator, whereby said operator is misted in memorizing said second pairs assigned to said first pairs.

11. The method of claim 1 wherein said chords of said first plurality of chords assigned to said letters correspond to two of said fingers of said operator, said letters more frequently occurring in American English generally being assigned chords easier to enter, frequently occurring vowels being assigned said chords assigned to said letters corresponding to corresponding fingers of the left hand and the right hand of said operator, a second plurality of chords involving only fingers is assigned to characters other than letters, said second plurality of chords involving three of said fingers of said operator being assigned to punctuation marks and miscellaneous characters and brackets for operating a computer, a third plurality of chords involving one of said fingers and one of said thumbs of said operator being assigned to commands for operating a computer, a fourth plurality of chords involving one of said digits of said operator being assigned to numerals, said numerals correspond in their natural order to said digits of said operator, and a plurality of first pairs of said inputs being assigned a plurality of second pairs of said chords, said plurality of first pairs being puirwise related inputs, said plurality of second pairs being each other's mirror image by pairwise exchanging switches assigned to corresponding digits of the left hand and the right hand of said operator.

12. A method of enabling an operator to generate any one of a plurality of inputs, comprising:

(a) providing a manual input means having a plurality of digit-operated switches by which a human operator can generate said plurality of inputs by entering chords, each chord comprising a unique combination of maid switches, each of said Switches being positioned to be operated by a respective digit of said operator, and (b) providing a legend presenting a plurality of first indicia representing said plurality of inputs, said plurality of first indicia selected from the class consisting of visual and tactile indicia, a first plurality of said plurality of first indicia arranged substantially in an array of diagonal rows, each of said rows representing a specific digit, each chord corresponding to a specific row of said rows comprising a specific switch of said switches, the switch corresponding to the digit represented by the row, said rows arranged so that said operator can associate said rows directly with said respective digits, thereby mapping each first indicium of each of said rows to the digit represented by the row, whereby (1) said operator can easily determine two of said digits corresponding to each indicium of said first plurality by visualizing the position of the indicium relative to said rows, and (2) said legend can be very compact.

13. The method of claim 12 wharein said first indicia are symbols found on a standard computer keyboard, whereby said manual input means in combination with said legend can be an alternative to the standard computer keyboard.

14. The method of claim 12 wherin each chord corresponding to a specific row of said rows of indicia comprises exactly one switch of said switches corresponding to a finger of a particular hand of said operator, the switch corresponding to the finger represented by the row, whereby said operator can easily determine the finger of said particular hand corresponding to said first indicia in said rows.

15. The method of claim 12 wherein said rows of indicia are labeled with respective second indicia, said second indicia indicating said digits represented by said rows, whereby said operator can determine said digits represented by said rows.

16. The method of claim 15 wherein said second indicia are colors.

17. The method of claim 15 wherein said second indicia are area shaped like the respective digits.

18. The method of claim 12 wherein a middle column of said array corresponding to corresponding digits of the left hand and the right hand of said operator is labeled with a second indicium, whereby said first indicia corresponding to corresponding digits are easily distinguished by said operator, and whereby maid first indicia of said array to the left of said middle column and said first indicia of said array to the right of said middle column can be easily distinguished by said operator as separate groups.

19. The method of claim 12 wherein said second indicium is a color.

20. The method of claim 12 wherein a second plurality of said plurality of first indicia corresponding to two adjacent digits of a particular hand of said operator is shown adjacent to said array, each indicium of said second plurality shown between adjacent rows of said diagonal rows corresponding to the indicium, whereby said operator can easily determine said adjacent digits corresponding to each indicium of said second plurality by visualizing the position of the indicium relative to said array, and whereby said first indicia corresponding to adjacent digits of the left hand of said operator and said first indicia corresponding to adjacent digits of the right hand of said operator can be easily distinguished by said operator as separate groups.

21. The method of claim 12 wherein a second plurality of said plurality of first indicia corresponding to digits of a particular hand of said operator is labeled with second indicia, said second indicia representing said digits of a particular band, whereby said operator can easily determine said digits corresponding to each indicium of said second plurality.

22. The method of claim 21 wherein said second indicia are colors.

23. The method of claim 12 wherein said first indicia are symbols found on a standard computer keyboard, each chord corresponding to a specific row of said rows of indicia comprises exactly one of said switches corresponding to a finger of a particular hand of said operator, the switch corresponding to the finger represented by the row, said rows of indicia being labeled with respective second indicia, said second indicia indicating said digits represented by said rows, said second indicia being colored areas shaped like the respective digits, a middle column of said array corresponding to corresponding digits of the left hand and the right hand of said operator being labeled with a third indicium, said third indicium being a color, a second plurality of said plurality of first indicia corresponding to two adjacent digits of a particular hand of said operator is shown adjacent to said array, each indicium of said second plurality shown between adjacent rows of said diagonal rows corresponding to the indicium, a third plurality of said plurality of first indicia corresponding to digits of a particular band of said operator is labeled with fourth indicia, said fourth indicia representing said digits of a particular hand, and said fourth indicia being colors.

24. A method of enabling an operator to generate any one of a plurality of inputs, comprising:

(a) providing a manual input means having a plurality of digit-operated switches by which a human operator can generate said plurality of inputs by entering chords, each chord comprising a unique combination of said switches, each of said switches being positioned to he operated by a respective digit of said operator, and (b) providing a legend presenting a plurality of first indicia representing said plurality of inputs, said plurality of first indicia selected from the class consisting of visual and tactile indicia, a plurality of said plurality of first indicia arranged substantially in an array, said array comprising:

(1) a plurality of first rows along a first dimension, each of said first rows representing a specific digit, each chord corresponding to a specific row of said first rows comprising a specific switch of said switches, the switch corresponding to the digit represented by the row, said first rows arranged so that said operator can associate said first rows directly with said respective digits, thereby mapping each first indicium of each of said first rows to the digit represented by the row, and (2) a plurality of second rows along a second dimension, said first indicia of each of said second rows corresponding to a specific type of chord, whereby (1) said operator can easily determine one of said digits corresponding to each indicium of said plurality of said plurality of first indicia by visualizing the position of the indicium relative to said first rows, (2) said operator can easily determine the type of chord corresponding to said first indicia of said first rows by knowing the row of said second rows of the indicium, and (3) said legend can be very compacts.

25. The method of claim 24 wherein said first indicia are symbols found on a standard computer keyboard, whereby said manual input means in combination with said legend can be an alternative to the standard computer keyboard.

26. The method of claim 24 wherein each chord corresponding to a specific row of said first rows of indicia comprises exactly one switch of said switches corresponding in a finger of a particular hand of said operator, the switch corresponding to the finger represented by the row, whereby said operator can easily determine the finger of said particular hand corresponding to said first indicia in said first rows.

27. The method of claim 24 wherein said first and second rows of indicia are labeled with respective second indicia, said second indicia indicating said digits represented by said first and second rows, whereby said operator can determine said digits represented by said first and second rows.

28. The method of claim 27 wherein said second indicia are colors.

29. The method of claim 27 wherein said second indicia are areas shaped like the respective digits.

30. The method of claim 24 wherein said first rows are columns, each of said columns being one of said first rows.

31. The method of claim 24 wherein each of said first rows is arranged approximately in line with one of said switches, whereby said operator can easily determine said digits represented by said first rows.

32. The method of claim 24 wherein said first indicia of each of said second rows are of a specific type, whereby said operator can easily determine the type of chord corresponding to said first indicia of said first rows by knowing the type of the indicium, and whereby said operator can easily determine the specific chord corresponding to each of said first indicia of said first rows by visualizing the row of said first rows of the indicium and knowing the type of the indicium.

33. The method of claim 24 wherein said first indicia are symbols found on a standard computer keyboard, each chord corresponding to a specific row of said first rows of indicia comprises exactly one of said switches corresponding to a finger of a particular hand of said operator, the switch corresponding to the finger represented by the row, said first and second rows of indicia being labeled with respective second indicia, said second indicia indicating said digits represented by said first and second rows, said second indicia being colored areas shaped like the respective digits, said first rows being columns, each of said columns being one of said first rows, each of said columns being arranged approximately in line with one of said switches, and said first indicia of each of said second rows being of a specific type.

34. A method of enabling an operator to generate a plurality of inputs, comprising:

(a) providing a manual input means having a plurality of digit-operated switches by which a human operator can generate said plurality of inputs by entering chords, each chord comprising a unique combination of said switches, each of said switches operated by a specific digit of said operator, and (b) providing a legend indicating a combination of colors for each of said plurality of inputs, the combination of colors representing the chord by which the input is entered, each of said colors representing a specific digit of said operator, said colors accompanied by indicia representing said digits, each of said indicia accompanying a specific color of said colors, the indicium accompanying the color representing the digit represented by the color, said indicia self-explanatory representing said digits, said colon thereby directly linked to said digits, whereby (1) the chord representations can stand out since colors can stand out, (2) said operator can instantaneously see that said colon represent said digits, (3) said manual input means combined with said legend can be intuitive and self-explanatory, (4) said combinations of colors can compactly and flexibly represent said chords, (5) each of said colors representing a specific digit can be easily recognized and distinguished, and (6) said operator can easily determine which chord to enter to generate one of said inputs.

35. The method of claim 34 wherein said switches are keys.

36. The method of claim 34 wherein said colors are pink, red, orange, yellow, white, black, green, blue, purple, and brown, corresponding respectively to the left hand little finger, ring finger, middle finger, index finger, thumb, and the tight band thumb, index finger, middle finger, ring finger, and little finger, whereby said operator needs to recognize and remember only simple, well-known colors, and whereby said operator can be misted in memorizing said colors representing said digits by using common knowledge of the order of colors in the spectrum of light as found in a rainbow.

37. The method of claim 34 wherein said colors form two easily distinguishable groups, one of said groups representing thumbs of said operator, and one of said groups representing fingers of said operator, said fingers being index, middle, ring, and little fingers, whereby said operator can instantly recognize said colors representing said thumbs of said operator and said colors representing said fingers of said operator.

38. The method of claim 37 wherein said colors representing the thumbs are white and black, and said colors representing the fingers are the real colors pink, red, orange, yellow, green, blue, purple, and brown.

39. The method of claim 34 wherein said colors form two easily distinguishable groups, each of said groups representing a particular hand of said operator, one of said groups representing the left hand and one of said groups representing the right hand, whereby said operator can instantly recognize said colors representing said particular hand of said operator.

40. The method of claim 39 wherein said colors representing the left hand are light colors, and said colors representing the right hand are dark colors.

41. The method of claim 34 wherein said indicia are areas shaped like the respective digits, said areas dimensioned and positioned relative to one another to resemble the digits of the human hand, whereby said areas are universally recognizable by human operators as representing the digits of the human hand.

42. The method of claim 34 wherein a plurality of said combinations of colors are arranged in groups, said combinations of each of said groups being a specific type of combination, whereby said operator can easily determine the specific type of each combination of said groups from the group of said combination.

43. The method of claim 42 wherein said combinations of one of said groups correspond to two-finger chords, and said combinations of one of said groups correspond to thumb chords.

44. The method of claim 34 wherein indicia representing said inputs are arranged in an array, rows of said array labeled by said colors, said rows corresponding to each of said indicia in said array labeled with said colors corresponding to one of said inputs, the input represented by the indicium, whereby said operator can determine which chord to enter to generate one of said inputs, and whereby said legend can be very compact.

45. The method of claim 34 wherein a first set of indicia representing said inputs and a second set of said combinations of colors are grouped in pairs, each of said pairs pairing one combination of said second set to one of said indicia of said first set, such that entering the chord corresponding to each pair of said pairs generates the input corresponding to the pair, whereby said operator can determine which chord to enter to generate one of said inputs.

46. The method of claim 34 wherein each of said combinations of colors is arranged in at least one group, said group representing the class consisting of said fingers of a particular hand of said operator and said thumb of said operator, whereby said operator can easily determine the colors of maid combinations representing the fingers of a particular hand or the thumbs.

47. The method of claim 34 wherein said switches are keys, said colors are pink, red, orange, yellow, white, black, green, blue, purple, and brown, corresponding respectively to the left hand little finger, ring finger, middle finger, index finger, thumb, and the right hand thumb, index finger, middle finger, ring finger, and little finger, said colors forming two easily distinguishable first groups, one of said first groups representing thumbs of said operator, and one of said first groups representing fingers of said operator, said fingers being index, middle, ring, and little fingers, said colors representing the thumbs being white and black, and said colors representing the fingers being the real colors pink, red, orange, yellow, green, blue, purple, and brown, said colors forming two easily distinguishable second groups, each of said second groups representing a particular band of said operator, one of said second groups representing the left hand and one of said second groups representing the right hand, said colors representing the left hand being light colors, and said colors representing the right hand being dark colors, said indicia being areas shaped like the respective digits, said areas dimensioned and positioned relative to one another to resemble the digits of the human hand, a plurality of said combinations of colors being arranged in third groups, said combinations of each of said third groups being a specific type of combination, said combinations of one of said third groups corresponding to two-finger chords, and said combinations of one of said third groups corresponding to thumb chords, indicia representing said inputs being arranged in an array, rows of said my labeled by said colors, said rows corresponding to each of said indicia in said array labeled with said colors corresponding to one of said inputs, the input represented by the indicium, a first set of indicia representing maid inputs and a second set of said combinations being grouped in pairs, each of said pairs pairing one combination of said second set to one of said indicia of said first set, such that entering the chord corresponding to each pair of said pairs generates the input corresponding to the pair, and each of said combinations being arranged in at least one fourth group, said group representing the class consisting of said fingers of a particular hand of said operator and said thumbs of said operator.

48. A method of enabling an operator to generate a plurality of inputs, comprising:

(a) providing a manual input means having a plurality of digit-operated switches by which a human operator can generate said plurality of inputs by entering chords, each chord comprising a unique combination of said switches, each of said switches being positioned to be operated by a respective digit of said operator, and (b) providing a legend indicating a combination of colors for each of said plurality of inputs, the combination of colors representing the chord by which the input is entered, each of said colors representing a specific digit of said operator, said colors representing said digits indicated on said switches, the color on each of said switches representing the digit operating the switch, said colors thereby linked to said digits via said switches, whereby (1) the chord representations can stand out since colors can stand out, (2) said operator can instantaneously see that said colors represent said digits, (3) maid manual input means combined with said legend can be intuitive and self-explanatory, (4) said combinations of colors can compactly and flexibly represent said chords, (5) each of said colors representing a specific digit can be easily recognized and distinguished, and (6) said operator can easily determine which chord to enter to generate one of said inputs.

49. The method of claim 48 wherein said switches are keys.

50. The method of claim 48 wherein said colors are pink, red, orange, yellow, white, black, green, blue, purple, and brown, corresponding respectively to the left hand little finger, ring finger, middle finger, index finger, thumb, and the right hand thumb, index finger, middle finger, ring finger, and little finger, whereby said operator needs to recognize and remember only simple, well-known colors, and whereby said operator can be assisted in memorizing said colors representing said digits by using common knowledge of the order of colors in the spectrum of light as found in a rainbow.

51. The method of claim 48 wherein said colors form two easily distinguishable groups, one of said groups representing thumbs of said operator, and one of said groups representing fingers of said operator, said fingers being index, middle, ring, and little fingers, whereby said operator can instantly recognize said colors representing said thumbs of said operator and said colors representing said fingers of said operator.

52. The method of claim 51 wherein said colors representing the thumbs are white and black, and said colors representing the fingers are the real colors pink, red, orange, yellow, green, blue, purple, and brown.

53. The method of claim 48 wherein said colors form two easily distinguishable groups, each of said groups representing a particular hand of said operator, one of said groups representing the left hand and one of said groups representing the right band, whereby said operator can instantly recognize said colors representing said particular hand of said operator.

54. The method of claim 53 wherein said colors representing the left hand are light colors, colors representing the right hand are dark colors.

55. The method of claim 48 wherein said colors are accompanied by indicia, said indicia possibly in combination with said color clearly representing said switches, whereby said colors are very clearly linked to said digits via said switches.

56. The method of claim 55 wherein said indicia are areas shaped like the switches, whereby said areas in combination with said colors clearly represent said switches.

57. The method of claim 48 wherein a plurality of maid combinations of colors are arranged groups, said combinations of each of said groups being a specific type of combination, whereby said operator can easily determine the specific type of each combination of said groups from the group of said combination.

58. The method of claim 57 wherein said combinations of one of said groups correspond to two-finger chords, and said combinations of one of said groups corresponds to thumb chords.

59. The method of claim 48 wherein indicia representing said inputs are arranged in an array, rows of said array labeled by said colors, said rows corresponding to each of said indicia in said array labeled with said colors corresponding to one of said inputs, the input represented by the indicium, whereby said operator can determine which chord to enter to generate one of said inputs, and whereby said legend can be very compact.

60. The method of claim 48 wherein a first set of indicia representing said inputs and a second set of said combinations of colors are grouped in pairs, each of said pairs pairing one combination of said second set to one of said indicia of said first set, such that entering the chord corresponding to each pair of said pairs generates the input corresponding to the pair, whereby said operator can determine which chord to enter to generate one of said inputs.

61. The method of claim 48 wherein each of said combinations of colors is arranged in at least one group, said group representing the class consisting of said fingers of a particular hand of said operator and said thumbs of said operator, whereby said operator can easily determine the colors of said combinations representing the fingers of a particular hand or the thumbs.

62. The method of claim 48 wherein said switches are keys, said colors are pink, red, orange, yellow, white, black, green, blue, purple, and brown, corresponding respectively to the left hand little finger, ring finger, middle finger, index finger, thumb, and the right hand thumb, index finger, middle finger, ring finger, and little finger, said colors forming two easily distinguishable first groups, one of said first groups representing thumbs of said operator, and one of said first groups representing fingers of said operator, said fingers being index, middle, ring, and little fingers, said colors representing the thumbs being white and black, and said colors representing the fingers being the real colon pink, red, orange, yellow, green, blue, purple, and brown, said colors forming two easily distinguishable second groups, each of said second groups representing a particular hand of said operator, one of said second groups representing the left hand and one of said second groups representing the right hand, said colors representing the left hand being light colors, and said colon representing the right hand being dark colors, said colors being accompanied by indicia, said indicia possibly in combination with said colors clearly representing said switches, said indicia being areas shaped like the switches, a plurality of said combinations of colors being arranged in third groups, said combinations of each of said third groups being a specific type of combination, said combinations of one of said third groups corresponding to two-finger chords, and said combinations of one of said third groups corresponding to thumb chords, indicia representing said inputs being arranged in an array, rows of said array labeled by said colors, said rows corresponding to each of said indicia in said array labeled with said colors corresponding to one of said inputs, the input represented by the indicium, a first set of indicia representing said inputs and a second set of said combinations being grouped in pairs, each of said pairs pairing one combination of said second set to one of said indicia of said first set, such that entering the chord corresponding to each pair of said pairs generates the input corresponding to the pair, and each of said combinations being arranged in at least one fourth group, said group representing the class consisting of said fingers of a particular band of said operator and said thumbs of said operator.

63. A device for enabling an operator to generate a plurality of inputs, comprising:

(a) a manual input means having a plurality of digit-operated switches by which a human operator can generate said plurality of inputs by entering chords, each of said switches operated by a specific digit of said operator, said inputs comprising letters, said letters comprising the alphabet, (b) a plurality of modifiers, maid modifiers being symbols other than said letters, said modifiers used in combination with non-modifier symbols to provide an input selected from the class consisting of a different case of the non-modifier symbol and a combination of the modifier and the non-modifier symbol, said non-modifier symbols including said letters, (c) assigning a first plurality of chords involving only fingers to said letters, said fingers being index, middle, ring, and little fingers of said operator, and (d) assigning at least one chord involving only thumbs of said operator to said respective modifiers, whereby (1) each chord composed of each chord assigned to said letters and each chord assigned to said modifiers can be assigned to a modified letter, (2) said modified letters can be readily input by said operator by entering a chord said operator composes of one chord assigned to said letters and one chord assigned to said modifiers, (3) said combination can be a known combination of the modifier and the letter commonly used as input to known computer programs, (4) accidental input of said modified letters during input of said letters is prevented, and (5) said chords involving only thumbs can be easily memorized by said operator as a specific type of chord assigned to said modifiers.

64. The device of claim 63 wherein said chords of said first plurality of chords assigned to said letters correspond to two of said fingers of said operator, whereby said letters can readily be input, and whereby said chords involving two fingers can be easily memorized by said operator as a specific type of chord assigned to said letters.

65. The device of claim 64 wherein those of said letters which occur more frequently in American English are assigned chords which are easier to enter, whereby American English is easier to input.

66. The device of claim 64 wherein frequently occurring vowels are assigned said chords assigned to said letters corresponding to corresponding fingers of the left hand and the right band of said operator, whereby said chords corresponding to corresponding fingers of the left band and the right hand can be easily memorized by said operator as a specific type of chord assigned to frequently occurring vowels.

67. The device of claim 63 wherein a second plurality of chords involving only fingers is assigned to respective characters other than letters, whereby each chord composed of each chord assigned to said characters and each chord assigned to said modifiers can be assigned to a modified character, said modified character being a combination of the modifier and the character, and whereby said modified characters can be readily input by said operator by entering a chord said operator composes of one chord assigned to said characters and one chord assigned to said modifiers.

68. The device of claim 67 wherein said second plurality of chords involving three of said fingers of said operator are assigned to punctuation marks and miscellaneous characters and brackets for operating a computer, whereby said punctuation marks and said miscellaneous characters and said brackets can readily be input, and whereby said first plurality of chords involving three of said fingers can be easily memorized by said operator as a specific type of chord assigned to said punctuation marks and said miscellaneous characters and said brackets.

69. The device of claim 63 wherein a second plurality of chords involving one of said fingers and one of said thumbs of said operator is assigned to commands for operating a computer, whereby said commands can readily be input, whereby said chords involving one of said finger and one of said thumbs can be easily memorized by said operator as a specific type of chord assigned to said commands, and whereby accidental input of said commands during input of said letters is prevented.

70. The device of claim 63 wherein a second plurality of chords involving one of said digits of said operator is assigned to numerals, whereby said numerals can readily be input, and whereby said chords involving one of said digits can he easily memorized by said operator as a specific type of chord assigned to said numerals.

71. The device of claim 70 wherein said numerals correspond in their natural order to said digits of said operator, whereby chords assigned to said numerals can be easily memorized.

72. The device of claim 63 wherein a plurality of first pairs of said inputs are assigned a plurality of second pairs of chords, said plurality of first pairs being pairwise related inputs, maid plurality of second pairs being each other's mirror image by pairwise exchanging switches assigned to corresponding digits of the left hand and the right hand of said operator, whereby said operator is assisted in memorizing said second pairs assigned to said first pairs.

73. The device of claim 63 wherein said chords of said first plurality of chords assigned to said letters correspond to two of said fingers of said operator, said letters more frequently occurring in American English generally being assigned chords easier to enter, frequently occurring vowels being assigned said chords assigned to said letters corresponding to corresponding fingers of the left hand and the right hand of said operator, a second plurality of chords involving only fingers is assigned to characters other than letters, said second plurality of chords involving three of said fingers of said operator being assigned to punctuation marks and miscellaneous characters and brackets for operating a computer, a third plurality of chords involving one of said fingers and one of said thumbs of said operator being assigned to commands for operating a computer, a fourth plurality of chords involving one of said digits of said operator being assigned to numerals, said numerals correspond in their natural order to said digits of said operator, and a plurality of first pairs of said inputs being assigned a plurality of second pairs of said chords, said plurality of first pairs being pairwise related inputs, said plurality of second pairs being each other's mirror image by pairwise exchanging switches assigned to corresponding digits of the left hand and the right hand of said operator.

* * * * *

UNITED STATES PATENT AND TRADEMARK OFFICE

CERTIFICATE OF CORRECTION

PATENT NO. : 6,943,776 B2
APPLICATION NO. : 10/083746
DATED : September 13, 2005
INVENTOR(S) : Herman Ehrenburg It is certified that error appears in the above-identified patent and that said Letters Patent is hereby corrected as shown below:

On the title page, item [75]:
Inventor, change to --Herman Ehrenburg, Laan van Van der Gaag 39, 2627 BS Delft (NL)--.

Abstract, line 3-4, change “legend (94) The keys” to --legend (94). The keys--.

Abstract, line 12-14, change “The legend (94) shows determination of chords by visualizing the position of symbols relative to the rows.” to --The legend (94) shows symbol arrays, rows of which represent digits involved in chords. The legend (94) enables determination of chords by visualizing the position of symbols relative to the rows.--.

Abstract, line 15, change “colored area.” to --colored areas.--.

Abstract, line 16, change “colored keys.” to --colored key.--.

Col. 1, line 4, add paragraph: --The file of this patent contains at least one color drawing. Copies of the patent with color drawings will be provided by the PTO upon payment of necessary fee.--

Col. 1, line 57, change “use” to --used--.

Col. 13, line 35-36, change “American <new paragraph> English” to --American English--.

Col. 35, line 4, change in “200” to --2004--.

Col. 35, line 5, change “braileprojcct” to --braileproject--.

Col. 38, line 2-3, change “Visualizable-Presented, Computer-Compatible, Color-Coded” to --Computer-Compatible, Visualizably Presented, Intuitive and Self-Explanatory--.

Col. 42, line 1, change “maid inputs” to --said inputs--.

Col. 42, line 3, change “of modifiets” to --of modifiers--.

Col. 42, line 4, change “modifier, used” to --modifiers used--.

Col. 42, line 20, change “maid letters” to --said letters--.

UNITED STATES PATENT AND TRADEMARK OFFICE

CERTIFICATE OF CORRECTION

PATENT NO. : 6,943,776 B2
APPLICATION NO. : 10/083746
DATED : September 13, 2005
INVENTOR(S) : Herman Ehrenburg It is certified that error appears in the above-identified patent and that said Letters Patent is hereby corrected as shown below:

Col. 42, line 25, change “maid chords” to --said chords--.

Col. 43, line 22, change “minor” to --mirror--.

Col. 43, line 23, change “coirespouding” to --corresponding--.

Col. 43, line 24, change “misted” to --assisted--.

Col. 43, line 52, change “puirwise” to --pairwise--.

Col. 43, line 62-63, change “combination or maid switches” to --combination of said switches--.

Col. 43, line 63, change “each of said Switches” to --each of said switches--.

Col. 44, line 15, change “wharein” to --wherein--.

Col. 44, line 34, change “area” to --areas--.

Col. 44, line 40, change “and whereby maid” to --and whereby said--.

Col. 44, line 44, change “claim 12” to --claim 18--.

Col. 44, line 63, change “band” to --hand--.

Col. 45, line 24, change “band” to --hand--.

Col. 45, line 35, change “he” to --be--.

Col. 45, line 63, change “compacts” to --compact--.

Col. 46, line 4, change “in” to --to--.

Col. 47, line 3, change “colon” to --colors--.

Col. 47, line 7, change “colon” to --colors--.

Col. 47, line 22, change “tight band” to --right hand--.

Col. 47, line 25, change “misted” to --assisted--.

UNITED STATES PATENT AND TRADEMARK OFFICE
CERTIFICATE OF CORRECTION

PATENT NO. : 6,943,776 B2
APPLICATION NO. : 10/083746
DATED : September 13, 2005
INVENTOR(S) : Herman Ehrenburg It is certified that error appears in the above-identified patent and that said Letters Patent is hereby corrected as shown below:

Col. 48, line 18, change “thumb” to --thumbs--.

Col. 48, line 20, change “maid” to --said--.

Col. 48, line 41, change “band” to --hand--.

Col. 48, line 58, change “said my” to --said array--.

Col. 48, line 62, change “maid inputs” to --said inputs--.

Col. 49, line 24, change “maid manual” to --said manual--.

Col. 49, line 60, change “right band” to --right hand--.

Col. 49, line 64, change “colors representing” to --and said colors representing--.

Col. 50, line 1, change “color” to --colors--.

Col. 50, line 7, change “maid” to --said--.

Col. 50, line 54, change “colon” to --colors--.

Col. 50, line 63, change “and said colon” to --and said colors--.

Col. 51, line 22, change “band” to --hand--.

Col. 51, line 32, change “maid modifiers” to --said modifiers--.

Col. 52, line 4, change “band” to --hand--.

Col. 52, line 5, change “left band” to --left hand--.

Col. 52, line 32, change “finger” to --fingers--.

Col. 52, line 41, change “he” to --be--.

UNITED STATES PATENT AND TRADEMARK OFFICE

CERTIFICATE OF CORRECTION

PATENT NO. : 6,943,776 B2
APPLICATION NO. : 10/083746
DATED : September 13, 2005
INVENTOR(S) : Herman Ehrenburg It is certified that error appears in the above-identified patent and that said Letters Patent is hereby corrected as shown below:

Col. 52, line 50, change “maid” to --said--.

Signed and Sealed this

Twenty-second Day of May, 2007

JON W. DUDAS
*Director of the United States Patent and Trademark Office*